US012590911B2

(12) United States Patent
Zhang et al.

(10) Patent No.:     US 12,590,911 B2
(45) Date of Patent:          Mar. 31, 2026

(54) INSPECTION SYSTEM AND INSPECTION METHOD

(71) Applicants: Nuctech Company Limited, Beijing (CN); Tsinghua University, Beijing (CN)

(72) Inventors: Li Zhang, Beijing (CN); Zhiqiang Chen, Beijing (CN); Qingping Huang, Beijing (CN); Hui Ding, Beijing (CN); Yong Zhou, Beijing (CN); Xin Jin, Beijing (CN); Liming Yao, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 184 days.

(21) Appl. No.:     18/573,784

(22) PCT Filed:     Jul. 6, 2022

(86) PCT No.:     PCT/CN2022/104149
§ 371 (c)(1),
(2) Date:     Dec. 22, 2023

(87) PCT Pub. No.: WO2023/280217
PCT Pub. Date: Jan. 12, 2023

(65)          Prior Publication Data
US 2024/0361257 A1     Oct. 31, 2024

(30)          Foreign Application Priority Data
Jul. 7, 2021     (CN) .......................... 202110770950.2

(51) Int. Cl.
| | |
|---|---|
| *G01N 23/10* | (2018.01) |
| *G01N 23/046* | (2018.01) |
| *G01N 23/083* | (2018.01) |

(52) U.S. Cl.
CPC ......... *G01N 23/046* (2013.01); *G01N 23/083* (2013.01); *G01N 23/10* (2013.01);
(Continued)

(58) Field of Classification Search
None
See application file for complete search history.

(56)          References Cited

U.S. PATENT DOCUMENTS

| | | | |
|---|---|---|---|
| 6,269,141 | B1 | 7/2001 | Proksa et al. |
| 6,731,716 | B2 | 5/2004 | Mihara et al. |

(Continued)

FOREIGN PATENT DOCUMENTS

| | | |
|---|---|---|
| CN | 101071110 A | 11/2007 |
| CN | 101382508 A | 3/2009 |

(Continued)

OTHER PUBLICATIONS

"European Application Serial No. 22836963.3, Extended European Search Report mailed Jun. 3, 2025", 9 pgs.
(Continued)

*Primary Examiner* — Hoon K Song
(74) *Attorney, Agent, or Firm* — Schwegman Lundberg & Woessner, P.A.

(57)          ABSTRACT

An inspection system, including: a carrying device; at least one ray source and a detector assembly. When the at least one ray source is located at one of scanning positions relative to the carrying device, the at least one ray source and the detector assembly are lifted or lowered along the rotation axis relative to the carrying device and the at least one ray source emits X-rays. After the at least one ray source and the detector assembly are lifted or lowered a predetermined distance relative to the carrying device, the at least one ray source rotates around the rotation axis relative to the carrying device to another one of scanning positions. The inspec- (Continued)

tion system further reconstructs a three-dimensional scanning image of the object to be inspected based on detection data of the detector assembly.

18 Claims, 13 Drawing Sheets

(52) U.S. Cl.
CPC .................. *G01N 2223/204* (2013.01); *G01N 2223/3303* (2013.01); *G01N 2223/643* (2013.01)

(56) References Cited

U.S. PATENT DOCUMENTS

| | | | | |
|---|---|---|---|---|
| 7,233,644 | B1 * | 6/2007 | Bendahan | G01N 23/046 |
| | | | | 378/57 |
| 7,702,070 | B2 | 4/2010 | Kang et al. | |
| 9,069,092 | B2 * | 6/2015 | Oreper | G01T 1/2985 |
| 2003/0043958 | A1 | 3/2003 | Mihara et al. | |
| 2004/0109532 | A1 * | 6/2004 | Ford | G01N 23/046 |
| | | | | 378/57 |
| 2007/0280417 | A1 | 12/2007 | Kang et al. | |
| 2007/0286339 | A1 | 12/2007 | Rothschild | |
| 2008/0084962 | A1 | 4/2008 | Zhang et al. | |
| 2009/0060128 | A1 | 3/2009 | Kang et al. | |
| 2017/0071560 | A1 * | 3/2017 | Gregerson | A61B 6/0487 |

FOREIGN PATENT DOCUMENTS

| | | | |
|---|---|---|---|
| CN | 102422178 | A | 4/2012 |
| CN | 104122276 | A | 10/2014 |
| CN | 106018443 | A | 10/2016 |
| CN | 111552002 | A | 8/2020 |
| WO | 9919716 | | 4/1999 |
| WO | WO-02065917 | A1 | 8/2002 |
| WO | 2020018515 | | 1/2020 |
| WO | 2021007445 | | 1/2021 |

OTHER PUBLICATIONS

"International Application Serial No. PCT/CN2022/104149, International Search Report dated Sep. 26, 2022", w/ English Translation, (Sep. 26, 2022), 7 pgs.

"International Application Serial No. PCT/CN2022/104149, Written Opinion dated Sep. 26, 2022", (Sep. 26, 2022), 6 pgs.

"Chinese Application No. 202110770950.2, First Office Action dated Feb. 26, 2024", (Feb. 26, 2024), 21 pgs.

* cited by examiner

INSPECTION SYSTEM AND INSPECTION METHOD

PRIORITY APPLICATIONS

This application is a U.S. National Stage Filing under 35 U.S.C. § 371 from International Application No. PCT/CN2022/104149, filed on Jul. 6, 2022, and published as WO2023/280217 on Jan. 12, 2023, which claims the benefit of priority to Chinese Application No. 202110770950.2, filed on Jul. 7, 2021; the benefit of priority of each of which is hereby claimed herein, and which applications and publication are hereby incorporated herein by reference in their entireties.

TECHNICAL FIELD

The present disclosure relates to the field of security inspection technology, in particular, to an inspection system and an inspection method for security inspection, and more specifically, to an inspection system and an inspection method for a security inspection of an aviation pallet cargo.

BACKGROUND

The safety of the aviation pallet cargo or the aviation container is directly related to the safety of the aviation vehicle (such as aircraft). It is needed to perform a security inspection on the aviation pallet cargo before loading the aviation pallet cargo onto the aircraft. The aviation pallet cargo may have a large size, usually with a length of 1.2 m, a width of 1.2 m and a height of 1.65 m, or even larger. Different types of cargoes may be stacked together inside the aviation pallet cargo.

Various existing inspection methods for aviation pallet cargoes have respective problems. Therefore, there is a need to provide an improved inspection system and inspection method, especially an inspection system and an inspection method for an aviation pallet cargo.

The above information disclosed in this section is just for understanding of the background of the inventive concept of the present disclosure. Therefore, the above information may contain information that does not constitute the related art.

SUMMARY

In an aspect of the present disclosure, an inspection system is provided, comprising: a carrying device configured to carry an object to be inspected in an inspection region of the inspection system; at least one ray source configured to emit X-rays, wherein each ray source comprises a separate housing to define a vacuum space and comprises a plurality of target spots enclosed within the housing; and a detector assembly configured to receive X-rays emitted from the at least one ray source and passing through the inspection region, wherein the at least one ray source is rotatable between a plurality of scanning positions around a rotation axis relative to the carrying device, and the at least one ray source and the detector assembly are lifted or lowered along the rotation axis relative to the carrying device; wherein the inspection system is configured such that: the at least one ray source and the detector assembly are lifted or lowered along the rotation axis relative to the carrying device and the at least one ray source emits X-rays, when the at least one ray source is located at one of the plurality of scanning positions relative to the carrying device; and the at least one ray source rotates around the rotation axis relative to the carrying device to another one of the plurality of scanning positions, when the at least one ray source and the detector assembly are lifted or lowered a predetermined distance relative to the carrying device, and wherein the inspection system is further configured to reconstruct a three-dimensional scanning image of the object to be inspected based on detection data of the detector assembly.

According to some embodiments of the present disclosure, the at least one ray source is configured to rotate between different scanning positions relative to the carrying device, so that a combined scanning angle of the at least one ray source is greater than 180 degrees.

According to some embodiments of the present disclosure, the inspection system is configured such that: the at least one ray source and the detector assembly are not lifted or lowered along the rotation axis relative to the carrying device when the at least one ray source rotates between different scanning positions relative to the carrying device.

According to some embodiments of the present disclosure, a rotation angle of the at least one ray source between two adjacent scanning positions relative to the carrying device is less than a scanning angle of the ray source relative to the rotation axis.

According to some embodiments of the present disclosure, a rotation angle of the at least one ray source between two adjacent scanning positions relative to the carrying device is greater than an angle of adjacent target spots of each ray source relative to the rotation axis; and wherein the at least one ray source is further configured to be movable between at least two target spot positions relative to the carrying device, and a rotation angle of each ray source between two adjacent target spot positions relative to the carrying device is less than an angle of two adjacent target spots of the ray source relative to the rotation axis, or a movement distance of each ray source between two adjacent target spot positions relative to the carrying device is less than a spacing between two adjacent target spots of the ray source.

According to some embodiments of the present disclosure, a rotation angle of each ray source between two farthest target spot positions relative to the carrying device is less than the angle of two adjacent target spots of the ray source relative to the rotation axis, or a movement distance of each ray source between two farthest target spot positions relative to the carrying device is less than the spacing between two adjacent target spots of the ray source.

According to some embodiments of the present disclosure, the rotation axis is parallel to a vertical direction.

According to some embodiments of the present disclosure, a ray emission direction of each ray source is not perpendicular to the rotation axis.

According to some embodiments of the present disclosure, the inspection system is configured such that: the at least one ray source is configured not to emit X-rays when the at least one ray source rotates between different scanning positions relative to the carrying device.

According to some embodiments of the present disclosure, the detector assembly is arranged radially closer to the rotation axis relative to the at least one ray source.

According to some embodiments of the present disclosure, target spots of the at least one ray source are located in a first plane.

According to some embodiments of the present disclosure, detector crystals of the detector assembly are located in a second plane.

According to some embodiments of the present disclosure, the first plane is parallel to the second plane, and a target spot of each ray source is configured to deflect a predetermined tilt angle toward the detector assembly along the rotation axis, so that the X-rays emitted by each ray source are not blocked by the detector assembly before passing through the inspection region.

According to some embodiments of the present disclosure, the detector assembly comprises a plurality of detector arms, each detector arm is provided with a plurality of detector units, and each detector arm is configured to receive X-rays emitted by at least two ray sources.

According to some embodiments of the present disclosure, each detector unit comprises a detector crystal, and each detector crystal is arranged at an end of a corresponding detector unit close to the at least one ray source along the rotation axis.

According to some embodiments of the present disclosure, the plurality of detector arms are configured to extend completely around the rotation axis to form a detector ring.

According to some embodiments of the present disclosure, the at least one ray source comprises a plurality of ray sources, and the plurality of ray sources are spaced around the carrying device.

According to some embodiments of the present disclosure, the carrying device further comprises a carrying conveyor configured to transport the object to be inspected on the carrying device to enter and leave the inspection region; and wherein the at least one ray resource and the detector assembly are lifted or lowered along the rotation axis relative to the carrying device to not obstructing the object to be inspected from entering or leaving the inspection region, when the carrying conveyor transports the object to be inspected to enter or leave the inspection region.

According to some embodiments of the present disclosure, wherein the inspection system further comprises: an input conveyor configured to transport the object to be inspected to the carrying conveyor, wherein the input conveyor is movable close to and away from the carrying conveyor.

According to some embodiments of the present disclosure, wherein the inspection system further comprises: an output conveyor configured to receive the object to be inspected from the carrying conveyor, wherein the output conveyor is movable close to and away from the carrying conveyor.

According to some embodiments of the present disclosure, wherein the inspection system further comprises: an entrance conveyor configured to maintain a fixed position and transport the object to be inspected to the input conveyor, wherein the input conveyor is movable between the entrance conveyor and the carrying conveyor.

According to some embodiments of the present disclosure, wherein the inspection system further comprises: an exit conveyor configured to maintain a fixed position and receive the object to be inspected from the output conveyor, wherein the output conveyor is movable between the exit conveyor and the carrying conveyor.

According to some embodiments of the present disclosure, the at least one ray source is rotatable around the rotation axis; and/or the detector assembly is rotatable around the rotation axis.

According to some embodiments of the present disclosure, the at least one ray source and the detector assembly are rotatable around the rotation axis synchronously.

According to some embodiments of the present disclosure, the carrying device is rotatable around the rotation axis.

According to some embodiments of the present disclosure, the at least one ray source and the detector assembly are lifted or lowered along the rotation axis; or the carrying device is configured such that a carrying surface of the carrying device is lifted or lowered along the rotation axis.

In another aspect of the present disclosure, an inspection method is provided, comprising: (a) carrying an object to be inspected on a carrying device and in an inspection region; (b) positioning at least one ray source at one of a plurality of scanning positions surrounding the carrying device, wherein each ray source comprises a separate housing to define a vacuum space and comprises a plurality of target spots enclosed within the housing; (c) lifting or lowering the at least one ray source and the detector assembly along a rotation axis relative to the carrying device, while emitting X-rays from the at least one ray source, so that the X-rays pass through the object to be inspected and are received by the detector assembly, and a scanning process is completed until the at least one ray source and the detector assembly are lifted or lowered a predetermined distance relative to the conveying device; and (d) rotating the at least one ray source around the rotation axis relative to the carrying device to another one of the plurality of scanning positions, and repeating step (c) to complete a scanning process at each of the plurality of scanning positions; and (e) reconstructing a three-dimensional scanning image of the object to be inspected based on detection data of the detector assembly.

According to some embodiments of the present disclosure, steps (c) and (d) are repeated, so that a combined scanning angle of the at least one ray source is greater than 180 degrees.

According to some embodiments of the present disclosure, a lifting or lowering of the at least one ray source and the detector assembly relative to the carrying device is stopped after each time the at least one ray source and the detector assembly are lifted or lowered the predetermined distance relative to the carrying device, and in two adjacent repetitions of step (c), the at least one ray source and the detector assembly are lifted or lowered in opposite directions relative to the carrying device.

According to some embodiments of the present disclosure, a rotation angle of the ray source between two adjacent scanning positions relative to the carrying device is less than a scanning angle of the ray source relative to the rotation axis According to some embodiments of the present disclosure, a rotation angle of the at least one ray source between two adjacent scanning positions relative to the carrying device is greater than an angle of adjacent target spots of each ray source relative to the rotation axis; wherein the inspection method further comprises: after completing a scanning process at a scanning position in step (c), moving the at least one ray source to one of a plurality of target spot positions relative to the carrying device and repeating step (c), wherein the plurality of target spot positions comprise a current scanning position; and wherein a rotation angle of each ray source between two adjacent target spot positions relative to the carrying device is less than an angle of two adjacent target spots of the ray source relative to the rotation axis, or a movement distance of each ray source between two adjacent target spot positions relative to the carrying device is less than a spacing between two adjacent target spots of the ray source.

5

6

According to some embodiments of the present disclosure, a rotation angle of each ray source between two farthest target spot positions relative to the carrying device is less than the angle of two adjacent target spots of the ray source relative to the rotation axis, or a movement distance of each ray source between two farthest target spot positions relative to the carrying device is less than the spacing between two adjacent target spots of the ray source.

According to some embodiments of the present disclosure, the rotation axis is parallel to a vertical direction.

According to some embodiments of the present disclosure, a ray emission direction of each ray source is not perpendicular to the rotation axis.

According to some embodiments of the present disclosure, the at least one ray source is configured not to emit X-rays when the at least one ray source rotates between different scanning positions relative to the carrying device.

According to some embodiments of the present disclosure, the predetermined distance is adaptively determined based on the detection data of the detector assembly.

Figure 1:
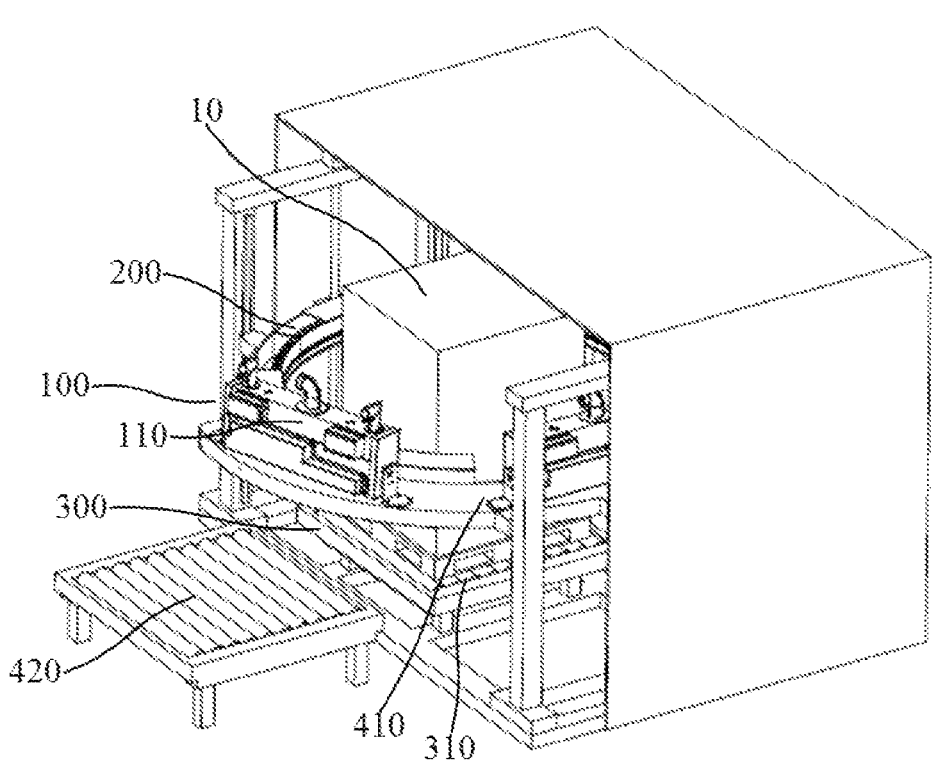
FIG. 1 shows a schematic diagram of an inspection system according to some embodiments of the present disclosure.

It should be noted that for the sake of clarity, in the drawings used to describe embodiments of the present disclosure, sizes of layers, structures or regions may be enlarged or reduced, that is, those drawings are not drawn according to actual scale.

DETAILED DESCRIPTION OF EMBODIMENTS

Hereinafter, embodiments of the present disclosure will be described with reference to accompanying drawings. The following detailed description and accompanying drawings are intended to illustrate principles of the present disclosure. The present disclosure is not limited to the described preferred embodiments, and the scope of the present disclosure is defined by the appended claims. The present disclosure will now be described in detail with reference to exemplary embodiments, and some of which are illustrated in the accompanying drawings. The following description is given with reference to the accompanying drawings. Unless otherwise specified, the same reference numerals in different drawings indicate the same or similar elements. The solutions described in the following exemplary embodiments do not represent all solutions of the present disclosure. Rather, those solutions are just examples of systems and methods of various aspects of the present disclosure that are addressed in the appended claims.

In the related art, an aviation pallet cargo may be inspected by using a variety of methods, for example, including: generating a perspective image using a single-view or dual-view X-ray inspection system; splicing a three-dimensional scanning image using a multi-view X-ray inspection system; dismantling the aviation pallet cargo to inspect objects one by one and then reloading the objects into an aviation pallet cargo; and generating a three-dimensional CT image using a CT scanning system.

In the first method described above, the single-view or dual-view X-ray inspection system may scan the aviation pallet cargo passing through a scanning region of the inspection system and generate a single-view or dual-view perspective image. However, as the aviation pallet cargo has a large size and the objects inside are stacked together, there may be a serious overlap in the perspective image generated by an existing single-view or dual-view X-ray inspection system, which makes it difficult to accurately detect prohibited items such as explosives, flammable liquids, knives and guns, etc. from the perspective image.

In the second method described above, the multi-view X-ray inspection system may scan the aviation pallet cargo passing through the scanning region of the inspection system and generate multi-view perspective images or splice the multi-view perspective images into a three-dimensional scanning image. By generating scanning images from multiple views and splicing the three-dimensional scanning image, it is possible to partially reduce an impact of an image overlap and improve an automatic recognition capability. However, such method may result in a low pass rate of objects to be inspected and a scanning angle is still limited. In addition, the spliced three-dimensional image has a poor quality, and the automatic recognition capability for prohibited items such as explosives is limited.

In the third method described above, the loaded aviation pallet cargo is dismantled manually for the security inspection of objects one by one, and then the objects are reloaded into an aviation pallet cargo. Such method has low efficiency and high labor costs.

In the fourth method described above, the three-dimensional scanning image may be generated by CT scanning which has a high recognition capability. Computed tomography (CT) is widely used in fields such as object detection and medical diagnosis, and the three-dimensional scanning image may be generated by CT scanning. According to a movement of a ray source relative to an object to be inspected during a scanning process, the existing CT scanning system may include a dynamic spiral CT scanning system and a static CT scanning system.

In the dynamic spiral CT scanning system, while the ray source continuously rotates around the object to be inspected during the scanning process, a conveying device may transport the object to be inspected horizontally through a scanning region at a constant speed. The dynamic spiral CT scanning system generally requires a slip ring and a bearing, and the slip ring needs to rotate at a high speed during the scanning process. If the object to be inspected has a large size, the slip ring and the bearing of the dynamic spiral CT scanning system need to have large diameters, which poses very high requirements to a machining accuracy of components as well as rigidity and stability of a support structure in the dynamic spiral CT scanning system. In addition, in the dynamic spiral CT scanning system using the slip ring, as a ray source and a detector are installed on a turntable with a large diameter and rotate synchronously, the conveying device for the dynamic spiral CT scanning system needs to be provided at a high position, which increases a difficulty of loading and/or unloading a large-sized object onto and/or off the conveying device.

In the static CT scanning system, the ray source is fixed during the entire scanning process, and an integrated ray source surrounding the inspection region is used for scanning. However, when the object to be inspected has a large size, it is difficult to design a large-sized integrated ray source, and a manufacturing cost is very high. Moreover, the integrated ray source needs to be replaced as a whole when a failure occurs (for example, several target spots are damaged), and thus has a poor maintainability.

The inspection system and the inspection method according to embodiments of the present disclosure may be applicable to a perspective imaging inspection of an object, especially an aviation pallet cargo or aviation container, etc.

Figure 2:
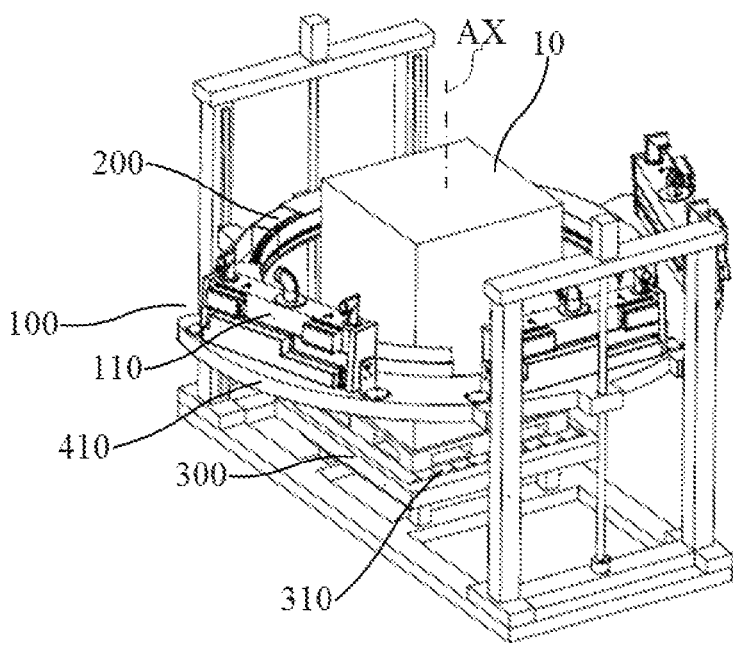
FIG. 2 shows a schematic diagram of an inspection system according to some embodiments of the present disclosure, in which an internal structure of the inspection system is shown.

FIG. 1 shows a schematic diagram of an inspection system according to some embodiments of the present disclosure. FIG. 2 shows a schematic diagram of an inspection system according to some embodiments of the present disclosure, in which an internal structure of the inspection system is shown.

In an exemplary embodiment, as shown in FIG. 1 and FIG. 2, the inspection system includes a plurality of ray sources 100, a detector assembly 200 and a carrying device 300. The inspection system defines an inspection region. The ray source 100 is used to emit X-rays. The detector assembly 200 is used to receive X-rays emitted from the ray source 100 and passing through the inspection region 30. The carrying device 300 is used to carry an object to be inspected 10 in the inspection region. In an exemplary embodiment, the object to be inspected is an aviation pallet cargo, or referred as an aviation container.

According to some embodiments of the present disclosure, the carrying device 300 may rotate around a rotation axis AX, and drive the object to be inspected on the carrying device 300 to rotate around the rotation axis. According to some embodiments of the present disclosure, after the object to be inspected enters the inspection region or during a scanning process, the carrying device 300 and the object to be inspected remain relatively stationary.

According to some embodiments of the present disclosure, the plurality of ray sources 100 and the detector assembly 200 may be lifted or lowered along the rotation axis (that is, in a direction parallel to the rotation axis) relative to the carrying device 300. In an exemplary embodiment, the rotation axis is along a vertical direction.

In the present disclosure, "axial direction" refers to a direction parallel to a rotation axis AX (or a central axis of the carrying device 300, which will be described in detail below), "radial direction" refers to a direction radiating outward from the rotation axis (or from the central axis of the carrying device 300) within a plane perpendicular to the rotation axis (or the central axis of the carrying device 300), and "circumferential direction" refers to a direction that is within the plane perpendicular to the rotation axis (or the central axis of the carrying device 300) and is perpendicular to the "radial direction".

In the present disclosure, the central axis of the carrying device 300 refers to an axis passing through an approximate center of a carrying surface of the carrying device 300 and being perpendicular to the carrying surface. In an exemplary embodiment, the central axis of the carrying device 300 is parallel to the vertical direction. In an exemplary embodiment, in a case that the carrying device 300 is rotatable around the rotation axis, the rotation axis may coincide with the central axis of the carrying device 300.

In the present disclosure, "lifted or lowered" refers to a lifting or a lowering along the rotation axis (or the central axis of the carrying device 300), that is, one time of lifting or one time of lowering.

The above-mentioned inspection system includes a plurality of ray sources 100. However, embodiments of the present disclosure are not limited thereto. According to some embodiments of the present disclosure, the inspection system may include one or more ray sources 100.

According to some embodiments of the present disclosure, each ray source 100 is a distributed ray source. In an exemplary embodiment, each ray source 100 has a separate housing 110 to define a separate vacuum space. Each ray source 100 includes a plurality of target spots (not shown in FIG. 1 and FIG. 2) enclosed within the housing 110. In an exemplary embodiment, the plurality of target spots of each ray source 100 have a uniform target spot spacing.

As described above, when the inspection system includes a plurality of ray sources 100, each ray source 100 defines a separate vacuum space and therefore does not share the vacuum space with other ray sources 100. The vacuum spaces of different ray sources 100 are not communicated with each other. According to some embodiments of the present disclosure, each ray source 100 may be disassembled from and/or assembled in the inspection system independently from other ray sources 100.

In the present disclosure, the "inspection region" refers to a region where the object to be inspected undergoes perspective imaging. When the object to be inspected is located in the inspection region, the X-rays emitted from the ray source 100 may penetrate the object to be inspected and be received by the detector assembly 200. In an exemplary embodiment, the inspection region includes an upper end and a lower end. According to some embodiments of the present disclosure, the inspection region may have a cross-section, such as a circular cross-section, in a plane perpendicular to the rotation axis.

As described above, the object to be inspected is an aviation pallet cargo. However, embodiments of the present disclosure are not limited thereto. According to some embodiments of the present disclosure, the inspection system may also be used to inspect other types of objects, especially an object with a large size.

According to some embodiments of the present disclosure, when the inspection system includes a plurality of ray sources 100, the plurality of ray sources 100 are spaced around the carrying device 300 (or the inspection region) when viewed along the rotation axis. In some embodiments, when viewed along the rotation axis, the plurality of ray sources 100 may include a ray source 100 in front of the inspection region, a ray source 100 on a left side of the inspection region, and/or a ray source 100 on a right side of the inspection region. Herein, "front" represents a side of the inspection region away from an entrance side, and "left side" and "right side" represent two sides of the inspection region adjacent to "front" and "entrance side", respectively:

A structure of the detector assembly according to some embodiments of the present disclosure will be described in detail below with reference to the accompanying drawings.

According to some embodiments of the present disclosure, the detector assembly 200 includes a plurality of detector units. In some embodiments, an arrangement of the detector units in the detector assembly 200 may be determined according to factors such as an arrangement of the ray sources 100 and/or a size of the object to be inspected. In some embodiments, a cost-effective arrangement may be adopted for the arrangement of the detector units in the detector assembly 200, that is, the number of detector units is minimized to meet imaging requirements.

Figure 3:
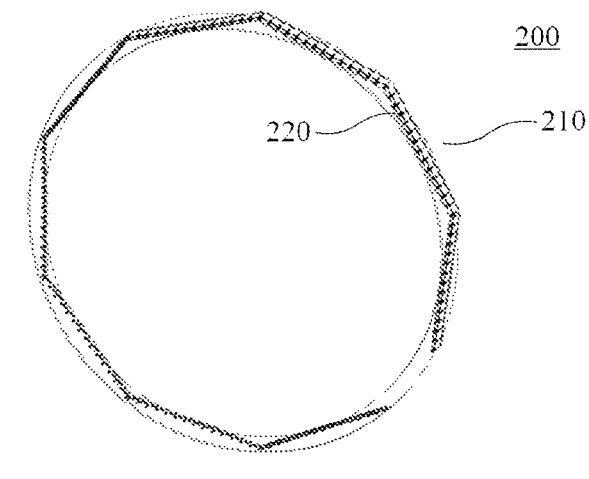
FIG. 3 shows a schematic diagram of a detector assembly according to some embodiments of the present disclosure.

FIG. 3 shows a schematic diagram of a detector assembly according to some embodiments of the present disclosure. According to some embodiments of the present disclosure, the detector assembly 200 includes a plurality of detector arms 210, and each detector arm 210 is provided with a plurality of detector units 220.

In an exemplary embodiment, the plurality of detector arms 210 of the detector assembly 200 extend completely around the inspection region. Thus, the plurality of detector arms 210 form a complete and continuous detector ring. In some embodiments, the detector ring may be a circular ring, an elliptical ring, a square ring, a rectangular ring, a polygonal ring, etc. In some embodiments, in a case that the plurality of detector arms 210 form a detector ring, the rotation axis may coincide with a center of the detector ring.

As described above, the plurality of detector arms 210 form a complete detector ring. However, embodiments of the present disclosure are not limited thereto. In some embodiments, the detector ring formed by the plurality of detector arms 210 may be incomplete, that is, it may include a gap; or the plurality of detector arms 210 may be spaced around the inspection region.

In some embodiments, when the inspection system includes a plurality of ray sources 100, each detector arm 210 of the detector assembly 200 may receive X-rays emitted by at least two ray sources 100. Thus, each detector arm 210 may be shared by at least two ray sources 100. In an exemplary embodiment, when the inspection system includes a plurality of ray sources 100, all target spots of the plurality of ray sources 100 are located in a same plane, that is, the plurality of ray sources 100 are coplanar. Herein, "the target spots are located in a same plane" represents that beam exit points of the target spots are all located in the same plane. In some embodiments, when the inspection system includes a plurality of ray sources 100 that are coplanar, each detector arm 210 of the detector assembly 200 may receive X-rays emitted by at least two ray sources 100.

Figure 13:
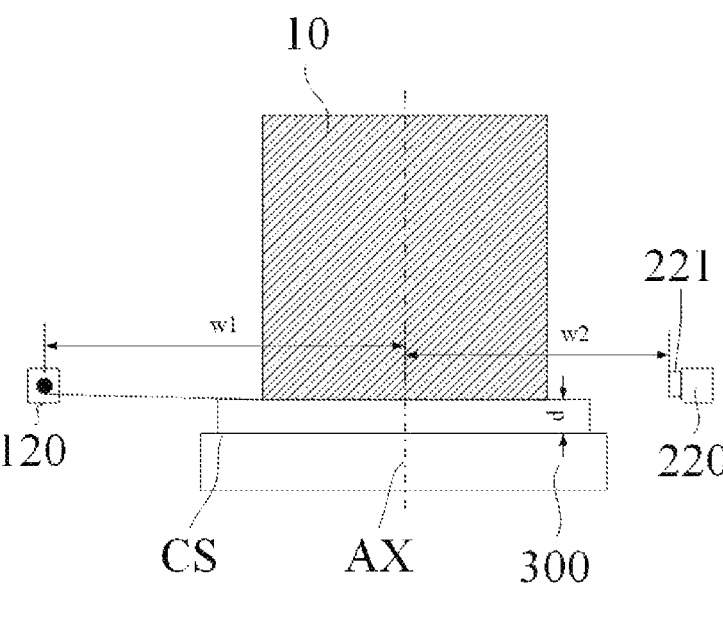
FIG. 13 shows a schematic cross-sectional view of an inspection system taken along a plane parallel to a rotation axis, according to some embodiments of the present disclosure.

According to some embodiments of the present disclosure, the detector assembly 200 is arranged radially closer to the rotation axis or the central axis of the carrying device 300 relative to the ray source 100. As shown in FIG. 13, a distance w2 between the detector assembly 200 and the rotation axis AX is less than a distance w1 between the ray source 100 and the rotation axis AX. In some embodiments, when the inspection system includes a plurality of ray sources 100, the detector assembly 200 is arranged radially closer to the rotation axis or the central axis of the carrying device 300 relative to all the ray sources 100. Thus, the detector assembly 200 is located on an inner side of the one or more ray sources 100 in the radial direction.

According to some embodiments of the present disclosure, the inspection system is configured such that the X-rays emitted by each ray source 100 may not be blocked by the detector assembly 200 before passing through the inspection region. In an exemplary embodiment, each detector unit 220 of the detector assembly 200 does not block X-rays emitted by one or more ray sources 100 on the same side as the detector unit 220, and may receive X-rays emitted by one or more ray sources 100 on another side. Herein, "the same side" represents that the detector unit 200 at least partially overlaps with the ray source(s) 100 when viewed in the radial direction.

Figure 4:
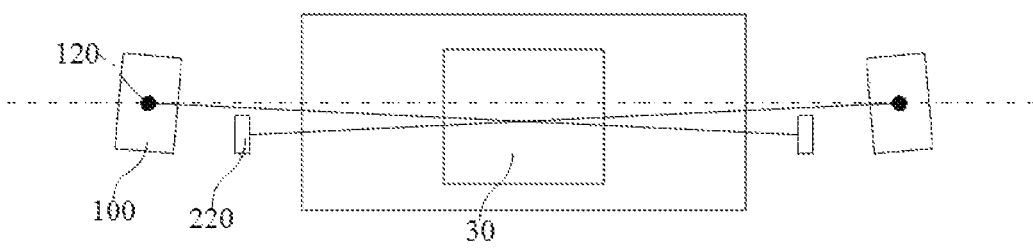
FIG. 4 shows a schematic diagram of a ray source and a detector unit according to some embodiments of the present disclosure.
Figure 4:

A relative position of the ray source and the detector unit according to some embodiments of the present disclosure will be described in detail below with reference to the accompanying drawings. FIG. 4 shows a schematic diagram of a ray source and a detector unit according to some embodiments of the present disclosure. In an exemplary embodiment, as shown in FIG. 4, all ray sources 100 (only two ray sources 100 are shown in FIG. 4) deflect an angle toward the detector assembly 200 along the rotation axis or the central axis of the carrying device. In some embodiments, each ray source 100 deflects about an axis of a target spot 120 of the ray source. In some embodiments, a deflection angle of the ray source 100 is less than or equal to 1.5 degrees. In some embodiments, a ray emission direction of the ray source 100 is not perpendicular to the rotation axis or the central axis of the carrying device.

By deflecting the ray source 100 relative to the detector assembly 200, the X-rays emitted by the ray source 100 may avoid the detector unit 220 of the detector assembly 200 on the same side, and may be received by the detector unit 220 of the detector assembly 200 on another side.

Figure 5:
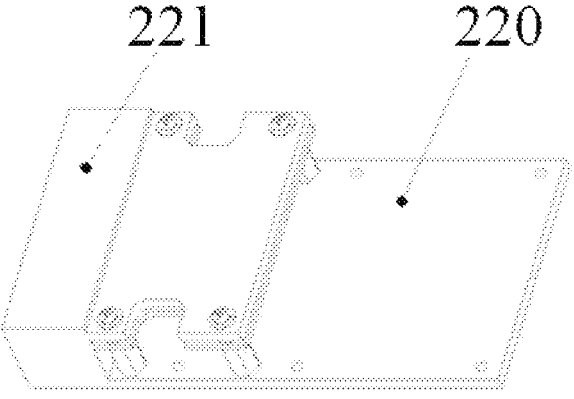
FIG. 5 shows a schematic diagram of a detector unit according to some embodiments of the present disclosure.

A specific structure of the detector unit according to some embodiments of the present disclosure will be described in detail below with reference to the accompanying drawings. FIG. 5 shows a schematic diagram of a detector unit according to some embodiments of the present disclosure. As shown in FIG. 5, each detector unit 220 includes a detector crystal 221. In an exemplary embodiment, the detector crystal 221 is provided at an end of the detector unit 220 close to the ray source 100 along the rotation axis or the central axis of the carrying device 300, as shown in FIG. 13. Therefore, each detector unit 220 may not block the X-rays emitted by the ray source 100 on the same side while receiving the X-rays emitted by the ray source 100 on another side.

In some embodiments, the detector unit 220 of the detector assembly 200 and the ray source 100 on the same side at least partially overlap in the axial direction. The detector crystal 221 of the detector unit 220 is arranged close to an edge of an X-ray beam emitted by the ray source 100 on the same side, so as to avoid blocking the X-rays emitted by the ray source 100 on the same side.

In an exemplary embodiment, all the detector crystals 221 of the detector assembly 200 are located in a same plane. Herein, "the detector crystals are located in a same plane" represents that center planes of the detector crystals are all located in the same plane. For example, the center planes of all the detector crystals 221 of the detector assembly 200 are located in the same plane through a same positioning reference. In some embodiments, the plane in which the detector crystal 221 is located is parallel to the plane in which the target spot is located.

As described above, all the target spots of the plurality of ray sources 100 are located in the same plane, that is, the plurality of ray sources 100 are coplanar. However, embodiments of the present disclosure are not limited thereto. In some embodiments, the target spots of the plurality of ray sources 100 may be non-coplanar. For example, different ray sources 100 may be staggered with each other in the axial direction.

As described above, all the detector crystals 221 of the detector assembly 200 are located in the same plane, that is, the detector assembly 200 is coplanar. However, embodiments of the present disclosure are not limited thereto. In some embodiments, the detector crystals 221 of the detector assembly 200 may be non-coplanar. For example, the detector crystals 221 on different detector arms 210 may be staggered with each other in the axial direction.

A lifting structure and a rotary structure of the inspection system according to some embodiments of the present disclosure will be described in detail below with reference to the accompanying drawings.

Figure 6:
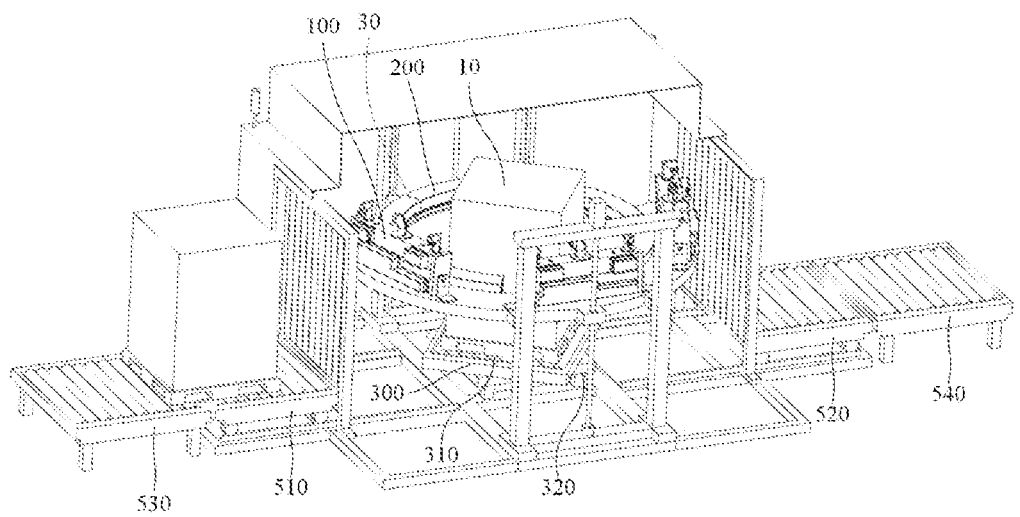
FIG. 6 shows a schematic diagram of an inspection system according to some embodiments of the present disclosure.

According to some embodiments of the present disclosure, the inspection system also includes a lifting platform 410 (with reference to FIG. 1 and FIG. 2) and a rotary platform 320 (not shown in FIG. 1 and FIG. 2, with reference to FIG. 6). The lifting platform 410 may be lifted or lowered along the rotation axis, and the rotary platform 320 is rotatable around the rotation axis.

In an exemplary embodiment, as shown in FIG. 1 and FIG. 2, the plurality of ray sources 100 and the detector assembly 200 are fixed to the lifting platform 410. The plurality of ray sources 100 and the detector assembly 200 may be lifted or lowered along the rotation axis by the lifting platform 410. Therefore, relative positions of the plurality of ray sources 100 and the detector assembly 200 are fixed, and the plurality of ray sources 100 and the detector assembly 200 may be lifted or lowered along the rotation axis synchronously.

In some embodiments, the lifting platform 410 may be lifted or lowered along the rotation axis by a lifting drive assembly (such as a linear guide rod, a linear drive motor, etc.). However, embodiments of the present disclosure are not limited thereto. According to embodiments of the present disclosure, the lifting platform 410 may be lifted or lowered along the rotation axis in other ways, which will not be repeated here.

In an exemplary embodiment, the ray source 100 and the detector assembly 200 are lifted or lowered along the rotation axis synchronously, that is, lifted or lowered together. However, embodiments of the present disclosure are not limited thereto. In some embodiments, the ray source 100 and the detector assembly 200 may also be lifted or lowered asynchronously. For example, the ray source 100 and the detector assembly 200 may be lifted or lowered in sequence.

In an exemplary embodiment, the carrying device 300 is fixed to the rotary platform 320. Therefore, a rotation of the carrying device 300 around the rotation axis may be realized by the rotary platform 320.

In some embodiments, the rotation of the rotary platform 320 around the rotation axis may be achieved by using a rotation drive assembly (such as a rotation drive motor, a roller, etc.). However, embodiments of the present disclosure are not limited thereto. According to embodiments of the present disclosure, the rotation of the rotary platform 320 around the rotation axis may also be achieved in other ways, which will not be repeated here.

As described above, the ray source 100 and the detector assembly 200 are lifted or lowered along the rotation axis. However, embodiments of the present disclosure are not limited thereto. According to some embodiments of the present disclosure, the ray source 100 and the detector assembly 200 may be lifted or lowered along the rotation axis or the central axis of the carrying device 300 relative to the carrying device 300. Herein, "lifted or lowered . . . relative to . . . " represents a relative movement of the ray source 100 and the detector assembly 200 relative to the carrying device 300 along the rotation axis or the central axis of the carrying device 300. For example, the "lifted or lowered . . . relative to . . . " may include at least the following situations: the ray source 100 and the detector assembly 200 are lifted or lowered while the carrying device 300 is not lifted or lowered; the ray source 100 and the detector assembly 200 are not lifted or lowered while the carrying device 300 (for example, the carrying surface of the carrying device 300) is lifted or lowered; and the ray source 100 and the detector assembly 200 are lifted or lowered while the carrying device 300 is lifted or lowered.

A structure and an operation of a carrying device according to some embodiments of the present disclosure will be described in detail below with reference to the accompanying drawings.

According to some embodiments of the present disclosure, the carrying device 300 may rotate around the rotation axis, while the ray source 100 does not rotate around the rotation axis. Therefore, through the rotation of the carrying device 300 around the rotation axis, a relative rotation around the rotation axis may be generated between the carrying device 300 and the ray source 100. According to some embodiments of the present disclosure, the carrying device 300 may move one or more times around the rotation axis relative to the ray source 100, thus the ray source 100 of the inspection system may be located at different scanning positions relative to the carrying device 300, that is, the ray source 100 may move between two or more scanning positions relative to the carrying device 300. Each ray source 100 may have a plurality of scanning positions relative to the carrying device 300. The plurality of scanning positions are distributed around the carrying device 300 when viewed along the rotation axis.

In the present disclosure, the "scanning position" refers to a position where a ray source 100 is located in a circumferential direction relative to the carrying device 300 (and the object to be inspected carried thereon) and where X-rays are emitted for scanning inspection. In some embodiments, the ray source 100 is allowed to emit X-rays only when the ray source 100 is located at a scanning position (the position of the ray source 100 is fixed relative to the carrying device 300 when viewed along the rotation axis) relative to the carrying device 300.

Therefore, the ray source 100 of the inspection system may have a plurality of scanning positions relative to the carrying device 300 and may move between different scanning positions relative to the carrying device 300, so that different ray emission ranges may be provided relative to the carrying device 300 and the object to be inspected and perspective imaging data at different angles may be obtained. For example, when the ray source 100 is located at a scanning position relative to the carrying device 300, the ray source 100 and the detector assembly 200 may be lifted or lowered along the rotation axis relative to the carrying device 300 (for example, from an upper end to a lower end of the inspection region, or vice versa), while the X-rays emitted by the ray source 100 may penetrate the object to be inspected and be received by the detector assembly 200, thereby the inspection system may obtain the perspective imaging data at the scanning position, that is, a scanning process is performed.

According to some embodiments of the present disclosure, the inspection system may be configured such that: the one or more ray sources 100 and the detector assembly 200 are lifted or lowered along the rotation axis relative to the carrying device 300 and the one or more ray sources 100 emit X-rays when the one or more ray sources 100 are located at one of the plurality of scanning positions relative to the carrying device 300; and the one or more ray sources 100 rotate around the rotation axis relative to the carrying device 300 to another one of the plurality of scanning positions after the one or more ray sources 100 and the detector assembly 200 are lifted or lowered by a predetermined distance relative to the carrying device 300. Therefore, a dynamic-static combined scanning method is used in the inspection system. When X-ray scanning is required, the one or more ray sources 100 may be located at a scanning position relative to the carrying device 300 and emit X-rays, while the one or more ray sources 100 and the detector assembly 200 are lifted or lowered along the rotation axis relative to the carrying device 300. When it is needed to change an X-ray emission range relative to the carrying device 300, the one or more ray sources 100 rotate around the rotation axis relative to the carrying device 300 and the object to be inspected, so that the one or more ray sources 100 move from a current scanning position to another scanning position relative to the carrying device 300. In some embodiments, the predetermined distance may be adaptively determined based on detection data of the detector assembly.

In some embodiments, when the ray source 100 moves between different scanning positions relative to the carrying device 300, the ray source 100 and the detector assembly 200 are not lifted or lowered along the rotation axis relative to the carrying device 300. In this case, after a scanning process is completed, the object to be inspected waits for the ray source 100 to move to a next scanning position relative to the carrying device 300, and then the ray source 100 and the detector assembly 200 are lifted or lowered along the rotation axis relative to the carrying device 300 for a next scanning process. In some embodiments, after each time the ray source 100 and the detector assembly 200 are lifted or lowered by a predetermined distance (for example, a height of the object to be inspected) relative to the carrying device 300 and a scanning process is completed, a lifting or lowering of the at least one ray source 100 and the detector assembly 200 relative to the carrying device 300 is stopped. In this case, in two adjacent lifting and lowering processes of the ray source 100 and the detector assembly 200 relative to the carrying device 300, the ray source 100 and the detector assembly 200 are lifted or lowered in opposite directions (for example, one relative lifting process relative to the carrying device 300 and one relative lowering process relative to the carrying device 300) relative to the carrying device 300. Thus, the ray source 100 and the detector assembly 200 may perform scanning each time they are lifted or lowered relative to the carrying device 300, and in this way, an inspection efficiency and an object passing rate may be improved. However, embodiments of the present disclosure are not limited thereto. In some embodiments, in each scanning process performed by the inspection system, the ray source 100 and the detector assembly 200 may be lifted or lowered (for example, relative lifting only or relative lowering only) in a same direction relative to the carrying device 300. In this case, the ray source 100 and the detector assembly 200 need to return to their respective initial positions relative to the carrying device 300 before each scanning process.

According to some embodiments of the present disclosure, the inspection system may be configured such that: the one or more ray sources 100 do not emit X-rays when the one or more ray sources 100 rotate between different scanning positions relative to the carrying device 300. In an exemplary embodiment, the inspection system may be configured such that: when the one or more ray sources 100 rotate between different scanning positions relative to the carrying device 300, the one or more ray sources 100 do not emit X-rays, and the ray source 100 and the detector assembly 200 are not lifted or lowered along the rotation axis relative to the carrying device 300.

However, embodiments of the present disclosure are not limited thereto. In some embodiments, when the one or more ray sources 100 rotate between different scanning positions relative to the carrying device 300, the one or more ray sources 100 may emit X-rays, and the ray source 100 and the detector assembly 200 may be lifted or lowered along the rotation axis or the central axis of the carrying device 300 relative to the carrying device 300. In this case, in some embodiments, a rotation speed of the ray source 100 around the rotation axis relative to the carrying device 300 is less than an equivalent exposure speed of the ray source 100. The equivalent exposure speed refers to an angle range of all the target spots of the ray source 100 relative to the rotation axis or the central axis of the carrying device 300 divided by a time length required for all the target spots in the ray source 100 to complete a round of exposure emission.

As described above, the ray source 100 and the detector assembly 200 rotate relative to the carrying device 300 synchronously. However, embodiments of the present disclosure are not limited thereto. In some embodiments, the rotation of the ray source 100 relative to the carrying device 300 and the rotation of the detector assembly 200 relative to the carrying device 300 may be asynchronous, that is, the ray source 100 and the detector assembly 200 may rotate relative to the carrying device 300, respectively.

As described above, the rotation of the ray source 100 or the rotation of the detector assembly 200 relative to the carrying device 300 is realized through the rotation of the carrying device 300. However, embodiments of the present disclosure are not limited thereto. According to some embodiments of the present disclosure, the rotation of the ray source 100 or the rotation of the detector assembly 200 relative to the carrying device 300 may also be realized by the rotation of the ray source 100 or the rotation of the detector assembly 200 around the rotation axis. In some embodiments, the rotation of the ray source 100 or the rotation of the detector assembly 200 relative to the carrying device 300 may also be realized by the rotation of the ray source 100 or the rotation of the detector assembly 200 around the rotation axis and the rotation of the carrying device 300 around the rotation axis.

In some embodiments, the carrying device 300 and the object to be inspected do not rotate, and the ray source 100 rotates around the rotation axis. For example, the ray source 100 may be rotatable around the rotation axis (for example, by a rotary device) and may be lifted or lowered along the rotation axis. In some embodiments, the carrying device 300 and the object to be inspected do not rotate, and the ray source 100 and the detector assembly 200 rotate around the rotation axis. For example, the ray source 100 and the detector assembly 200 may be rotatable around the rotation axis (for example, by a rotary device) and may be lifted or lowered along the rotation axis. In some embodiments, the carrying device 300 and the object to be inspected do not rotate, the ray source 100 rotates around the rotation axis, and the detector assembly 200 does not rotate. For example, the ray source 100 may be rotatable around the rotation axis (for example, by the rotary device) and may be lifted or lowered along the rotation axis, and the detector assembly 200 may be configured to be lifted or lowered along the rotation axis.

According to some embodiments of the present disclosure, the carrying device 300 may also include a carrying conveyor 310. The carrying conveyor 310 may transport the object to be inspected on the carrying device 300 to enter and leave the inspection region. In some embodiments, when the carrying conveyor 310 transports the object to be inspected to enter or leave the inspection region, the one or more ray sources 100 and the detector assembly 200 are lifted or lowered along the rotation axis relative to the carrying device 300 to not obstructing the object to be inspected from entering or leaving the inspection region. For example, the one or more ray sources 100 and the detector assembly 200 may be lifted to the upper end of the inspection region.

According to some embodiments of the present disclosure, the inspection system may also include an in-and-out conveyor 420. As shown in FIG. 1, the in-and-out conveyor 420 may be provided at an entrance of the inspection system. The in-and-out conveyor 420 may convey the object to be inspected to the carrying device 300 (for example, the carrying conveyor 310), and may also receive the object to be inspected that has been scanned from the carrying device 300.

FIG. 6 is a schematic diagram of an inspection system according to some embodiments of the present disclosure. In the embodiment shown in FIG. 6, the structures and principles of the ray source 100, the detector assembly 200 and the carrying device 300 of the inspection system are as described above and will not be repeated here. In addition, the inspection system further includes a conveying device.

According to some embodiments of the present disclosure, the conveying device may include an input conveyor 510 and an output conveyor 520. In an exemplary embodiment, the conveying device may also include an entrance conveyor 530 and an exit conveyor 540. Each of the input conveyor 510, the output conveyor 520, the entrance conveyor 530 and the exit conveyor 540 may carry and transport the object to be inspected, such as the aviation pallet cargo. In some embodiments, the input conveyor 510, the output conveyor 520, the entrance conveyor 530 or the exit conveyor 540 may transport the object to be inspected along a straight line, for example, the object to be inspected may be transported along a straight line at a constant speed.

In the present disclosure, the "transport" of a conveyor represents a movement of the object on a carrying surface of the conveyor, for example, by means of a belt, a roller, etc.

According to some embodiments of the present disclosure, the input conveyor 510 may transport the object to be inspected to the carrying device 300, for example, the carrying conveyor 310 of the carrying device 300. In some embodiments, the input conveyor 510 may also move close to and away from the carrying device 300. Therefore, the input conveyor 510 is movable automatically. For example, the input conveyor 510 may move toward the carrying device 300 while conveying the object to be inspected thereon. For example, after the input conveyor 510 transports the object to be inspected to the carrying device 300, the input conveyor 510 may move away from the carrying device 300. In some embodiments, the input conveyor 510 may move along a straight line, for example, at a constant speed.

In the present disclosure, the "move" of a conveyor represents a movement of the conveyor itself (for example, a movement on the ground), for example, by means of a rail, a roller, etc.

According to some embodiments of the present disclosure, the output conveyor 520 may receive the object to be inspected (for example, the object to be inspected that has been scanned) from the carrying device 300, for example, the carrying conveyor 310 of the carrying device 300. In some embodiments, the output conveyor 520 may also move close to and away from the carrying device 300. Therefore, the output conveyor 520 is movable automatically. For example, the output conveyor 520 may move toward the carrying device 300 to receive the object to be inspected. For example, after the output conveyor 520 receives the object to be inspected, the output conveyor 520 may move away from the carrying device 300 while transporting the object to be inspected thereon. In some embodiments, the output conveyor 520 may move along a straight line, for example, at a constant speed.

According to some embodiments of the present disclosure, the entrance conveyor 530 is used to transport the object to be inspected to the input conveyor 510. In some embodiments, the entrance conveyor 530 remains in a fixed position. In some embodiments, the input conveyor 510 may move between the entrance conveyor 530 and the carrying device 300 (for example, the carrying conveyor 310 of the carrying device 300). Therefore, the input conveyor 510 may receive the object to be inspected from the entrance conveyor 530 and convey the object to be inspected to the carrying device 300 through a combination of transporting and self-movement.

According to some embodiments of the present disclosure, the exit conveyor 540 is used to receive the object to be inspected from the output conveyor 520. In some embodiments, the exit conveyor 540 remains in a fixed position. In some embodiments, the output conveyor 520 may move between the carrying device 300 (for example, the carrying conveyor 310 of the carrying device 300) and the exit conveyor 540. Therefore, the output conveyor 520 may receive the object to be inspected from the carrying device 300 and convey the object to be inspected to the exit conveyor 540 through a combination of transporting and self-movement.

In some embodiments, when the input conveyor 510 transports the object to be inspected to the carrying device 300 or when the output conveyor 520 receives the object to be inspected from the carrying device 300, the one or more ray sources 100 and the detector assembly 200 are lifted or lowered along the rotation axis relative to the carrying device 300 to not obstructing the object to be inspected from reaching or leaving the carrying device 300.

An operation method of the conveying device according to some embodiments of the present disclosure will be described in detail below with reference to the accompanying drawings.

In a conveying process, the object to be inspected is first placed on the entrance conveyor 530. The input conveyor 510 docks with the entrance conveyor 530. The entrance conveyor 530 carries and transports the object to be inspected. Therefore, the object to be inspected is conveyed to the input conveyor 510.

Then, the input conveyor 510 carries and transports the object to be inspected while the input conveyor 510 itself moves toward the carrying device 300. When the input conveyor 510 docks with the carrying device 300, the input conveyor 510 transports the object to be inspected to the carrying device 300. Afterwards, the input conveyor 510 may move toward the entrance conveyor 530 to receive a next object to be inspected.

After the object to be inspected is scanned, the output conveyor 520 docks with the carrying device 300 and receives the object to be inspected from the carrying device 300. The output conveyor 520 carries and transports the object to be inspected while the output conveyor 520 itself moves toward the exit conveyor 540. When the output conveyor 520 docks with the exit conveyor 540, the output conveyor 520 conveys the object to be inspected to the exit conveyor 540. Afterwards, the output conveyor 520 may move toward the carrying device 300 to receive a next object to be inspected.

As described above, the conveying device inputs the object to be inspected to the carrying device 300 by the input conveyor 510 and outputs the object to be inspected from the carrying device 300 by the output conveyor 520. However, embodiments of the present disclosure are not limited thereto. In some embodiments, the conveying device may only include an input conveyor, which is not only used to input the object to be inspected to the carrying device 300, but also output the object to be inspected from the carrying device 300.

As described above, the conveying device initially receives the object to be inspected from the entrance conveyor 530 and finally conveys the object to be inspected to the exit conveyor 540. However, embodiments of the present disclosure are not limited thereto. In some embodiments, the conveying device may receive the object to be inspected from other devices or directly from outside, or the conveying device may finally convey the object to be inspected to other devices or the outside.

As described above, the ray source 100 and the carrying device 300 rotate relative to each other to change the scanning position. However, embodiments of the present disclosure are not limited thereto. According to some embodiments of the present disclosure, the ray source 100 and the carrying device 300 may relatively translate to change the scanning position, which will be described in detail below:

A relative movement between the ray source and the carrying device according to some embodiments of the present disclosure will be described in detail below with reference to the accompanying drawings.

According to some embodiments of the present disclosure, when viewed along the rotation axis or the central axis of the carrying device 300, a movement of the ray source 100 between different scanning positions relative to the carrying device 300 may include a rotation and a translation, which will be described in detail below:

According to some embodiments of the present disclosure, the movement of the ray source 100 between different scanning positions relative to the carrying device 300 may include the following situations: when viewed along the rotation axis or the central axis of the carrying device 300, the carrying device 300 moves while the ray source 100 remains fixed, or the ray source 100 moves while the carrying device 300 remains fixed, or both the ray source 100 and the carrying device 300 move. Similarly, according to some embodiments of the present disclosure, the movement of the detector assembly 200 relative to the carrying device 300 may include the following situations: when viewed along the rotation axis or the central axis of the carrying device 300, the carrying device 300 moves while the detector assembly 200 remains fixed, or the detector assembly 200 moves while the carrying device 300 remains fixed, or both the detector assembly 200 and the carrying device 300 move.

In an exemplary embodiment, the one or more ray sources 100 of the inspection system may be rotatable between at least two scanning positions around the rotation axis relative to the carrying device 300. In some embodiments, the rotation axis is parallel to the vertical direction. According to some embodiments of the present disclosure, when the inspection system includes a plurality of ray sources 100, the plurality of ray sources 100 may rotate between different scanning positions relative to the carrying device 300 synchronously.

According to some embodiments of the present disclosure, each ray source 100 has a scanning angle. Herein, the "scanning angle" of each ray source 100 refers to an angle range of all target spots of the ray source 100 relative to the rotation axis or the central axis of the carrying device 300, when viewed along the rotation axis or the central axis of the carrying device 300. When a ray source 100 rotates from one scanning position to another scanning position relative to the carrying device 300, the scanning angle of the ray source 100 relative to the carrying device 300 may rotate accordingly. According to some embodiments of the present disclosure, the rotation of each ray source 100 between different scanning positions relative to the carrying device 300 may provide a combined scanning angle relative to the carrying device 300. In some embodiments, when the inspection system includes a plurality of ray sources 100, the rotation of the plurality of ray sources 100 between different scanning positions relative to the carrying device 300 may also provide a combined scanning angle relative to the carrying device 300. Herein, the "combined scanning angle" refers to a scanning angle formed by a combination of the scanning angles of the one or more ray sources 100 at a plurality of scanning positions relative to the carrying device 300. In some embodiments, the combined scanning angle formed by the rotation of the one or more ray sources 100 between different scanning positions relative to the carrying device 300 may be continuous or discontinuous.

According to some embodiments of the present disclosure, through the rotation of the one or more ray sources 100 between different scanning positions relative to the carrying device 300, the inspection system may splice a larger combined scanning angle and ray emission range. Therefore, the rotation of the ray source 100 relative to the carrying device 300 may generate a larger scanning angle than a fixed ray source.

According to some embodiments of the present disclosure, the inspection system may also be configured to reconstruct a three-dimensional scanning image of the object to be inspected based on the detection data of the detector assembly 200. In an exemplary embodiment, the rotation of the one or more ray sources 100 of the inspection system between different scanning positions relative to the carrying device 300 may generate a combined scanning angle greater than 180 degrees relative to the carrying device 300. When the inspection system has a combined scanning angle greater than 180 degrees, the inspection system may generate more complete scanning data, and produce a better CT scanning effect and a better three-dimensional scanning image.

According to some embodiments of the present disclosure, a rotation angle of each ray source 100 between two adjacent scanning positions relative to the carrying device 300 is greater than an angle of adjacent target spots of the ray source 100 relative to the rotation axis. Therefore, the rotation of the ray source 100 between different scanning positions relative to the carrying device 300 may generate a combined scanning angle so as to achieve a wider range of scanning.

A structure of the one or more rotatable ray sources according to some embodiments of the present disclosure will be described in detail below with reference to the accompanying drawings.

According to some embodiments of the present disclosure, as shown in FIG. 7A to FIG. 9, each ray source 100 includes a plurality of target spots 120 spaced apart. It should be noted that other structures of the ray source 100 are not shown in FIG. 7A to FIG. 9. In an exemplary embodiment, the plurality of target spots 120 of each ray source 100 have a uniform target spot spacing. In some embodiments, the plurality of target spots 120 of each ray source 100 are distributed along a straight line.

An inspection system including three ray sources 100 will be illustrated by way of example in describing the following exemplary embodiment. According to some embodiments of the present disclosure, the inspection system may include three ray sources 100. In an exemplary embodiment, the three ray sources 100 are spaced apart from each other. The three ray sources 100 may be spaced around the carrying device 300. In some embodiments, each ray source 100 may have two scanning positions.

Figure 7A:
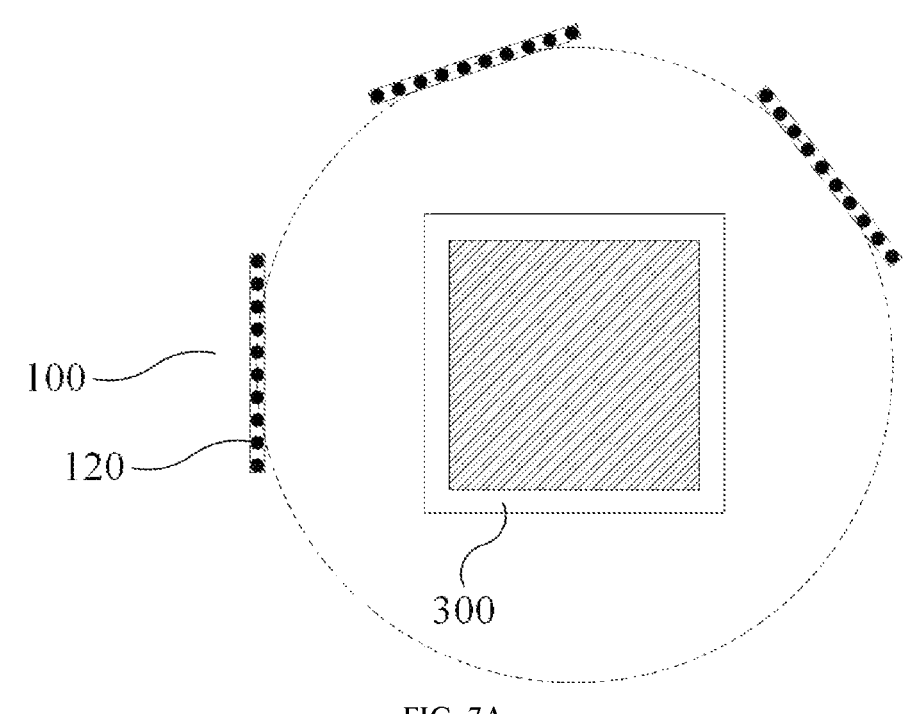
FIG. 7A shows a schematic diagram of an arrangement of a plurality of ray sources according to some embodiments of the present disclosure, in which three ray sources are located at a first scanning position relative to a carrying device.
Figure 7B:
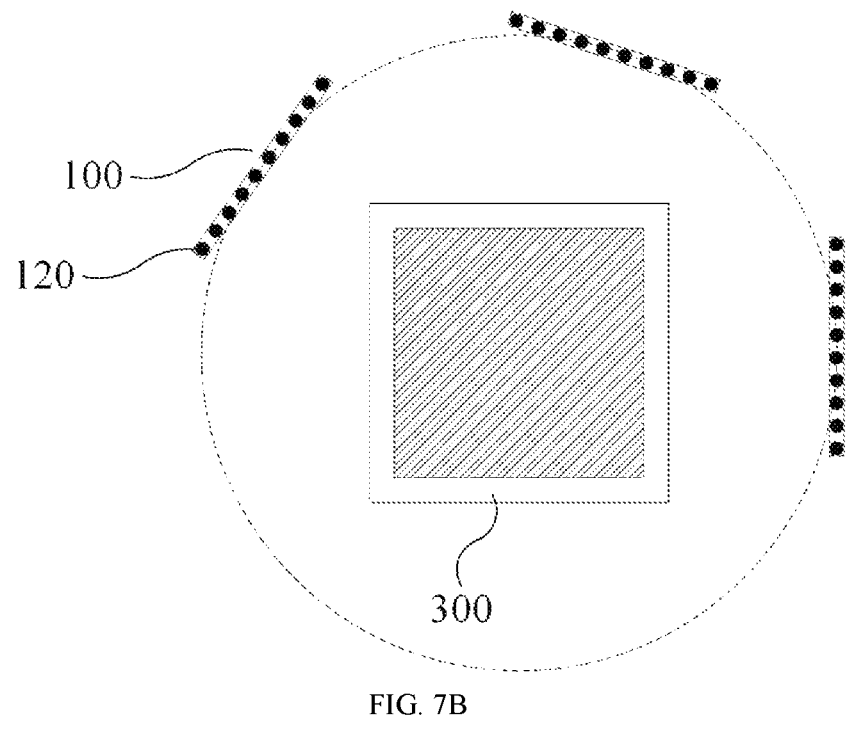
FIG. 7B shows a schematic diagram of an arrangement of a plurality of ray sources according to some embodiments of the present disclosure, in which three ray sources are located at a second scanning position relative to a carrying device.
Figure 7C:
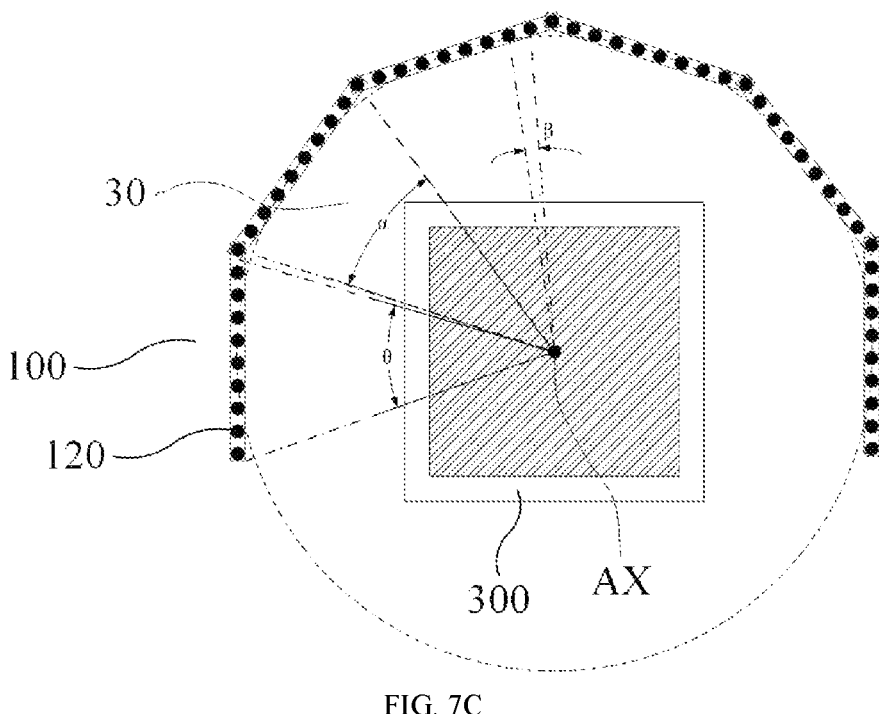
FIG. 7C shows a schematic diagram of an arrangement of a plurality of ray sources according to some embodiments of the present disclosure, in which a superposition state of three ray sources at first and second scanning positions relative to a carrying device is shown.

FIG. 7A shows a schematic diagram of an arrangement of a plurality of ray sources according to some embodiments of the present disclosure, in which three ray sources are located at a first scanning position relative to the carrying device. FIG. 7B shows a schematic diagram of an arrangement of a plurality of ray sources according to some embodiments of the present disclosure, in which three ray sources are located at a second scanning position relative to the carrying device. FIG. 7C shows a schematic diagram of an arrangement of a plurality of ray sources according to some embodiments of the present disclosure, in which a superposition state of three ray sources at first and the second scanning positions relative to the carrying device is shown.

As shown in FIG. 7A, the three ray sources 100 located at the first scanning position relative to the carrying device 300 may cover a scanning angle. When the three ray sources 100 are located at the first scanning position relative to the carrying device 300, target spots 120 of the three ray sources 100 may sequentially emit X-rays in a predetermined order, while the three ray sources 100 may be lifted or lowered (for example, from the upper end to the lower end of the inspection region) along the rotation axis relative to the carrying device 300, so that the emitted X-rays pass through the object to be inspected (shown as a shaded portion) and are received by the detector assembly (not shown in FIG. 7A). Therefore, the inspection system may complete a scanning process at the first scanning position.

After the scanning process at the first scanning position is completed, the three ray sources 100 may rotate around the rotation axis relative to the carrying device 300 (for example, in a clockwise direction) to the second scanning position. As shown in FIG. 7B, the three ray sources 100 located at the second scanning position relative to the carrying device 300 may cover another scanning angle. When the three ray sources 100 are located at the second scanning position relative to the carrying device 300, the target spots 120 of the three ray sources 100 may sequentially emit X-rays in a predetermined order, while the three ray sources 100 may be lifted or lowered (for example, from the lower end to the upper end of the inspection region) along the rotation axis relative to the carrying device 300, so that the X-rays pass through the object to be inspected (shown as a shaded portion) and are received by the detector assembly (not shown in FIG. 7B). Therefore, the inspection system may complete a scanning process at the second scanning position.

Through two scanning processes of the three ray sources 100 at the first scanning position and the second scanning position relative to the carrying device 300, as shown in FIG. 7C, the inspection system may combine the scanning angle at the first scanning position and the scanning angle at the second scanning position to generate a combined scanning angle. Therefore, the combined scanning angle generated by the inspection system through the rotation of the three ray sources 100 between the two scanning positions relative to the carrying device 300 is equivalent to a scanning angle generated simultaneously by six ray sources 100.

An inspection system including two ray sources 100 will be illustrated by way of example in describing the following exemplary embodiment. According to some embodiments of the present disclosure, the inspection system may include two ray sources 100. In an exemplary embodiment, the two ray sources 100 are spaced apart from each other. The two ray sources 100 may be spaced around the carrying device 300. In some embodiments, each ray source 100 may have three scanning positions.

Figure 8A:
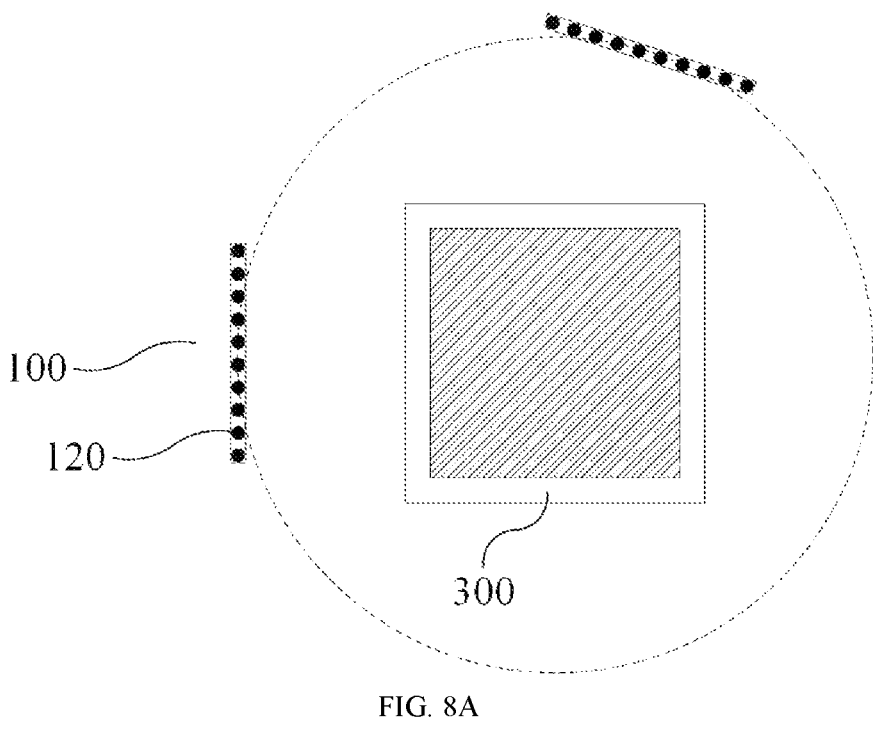
FIG. 8A shows a schematic diagram of an arrangement of a plurality of ray sources according to some embodiments of the present disclosure, in which two ray sources are located at a first scanning position relative to a carrying device.
Figure 8B:
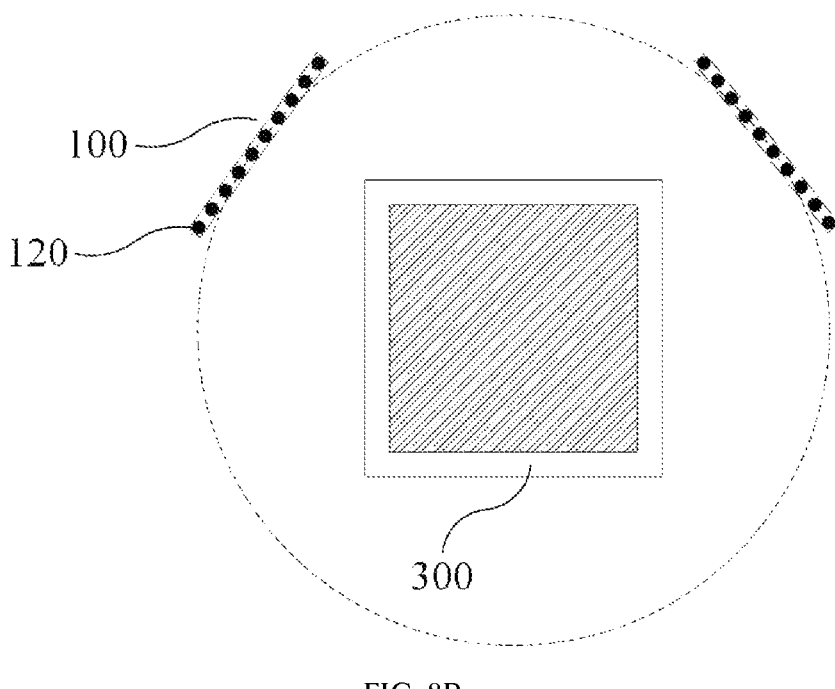
FIG. 8B shows a schematic diagram of an arrangement of a plurality of ray sources according to some embodiments of the present disclosure, in which two ray sources are located at a second scanning position relative to a carrying device.
Figure 8C:
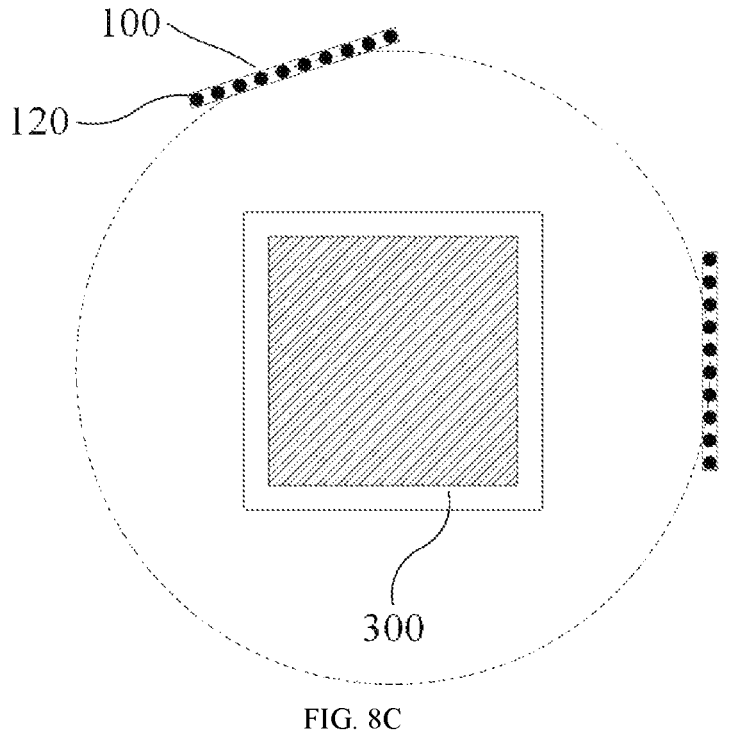
FIG. 8C shows a schematic diagram of an arrangement of a plurality of ray sources according to some embodiments of the present disclosure, in which two ray sources are located at a third scanning position relative to a carrying device.
Figure 8D:
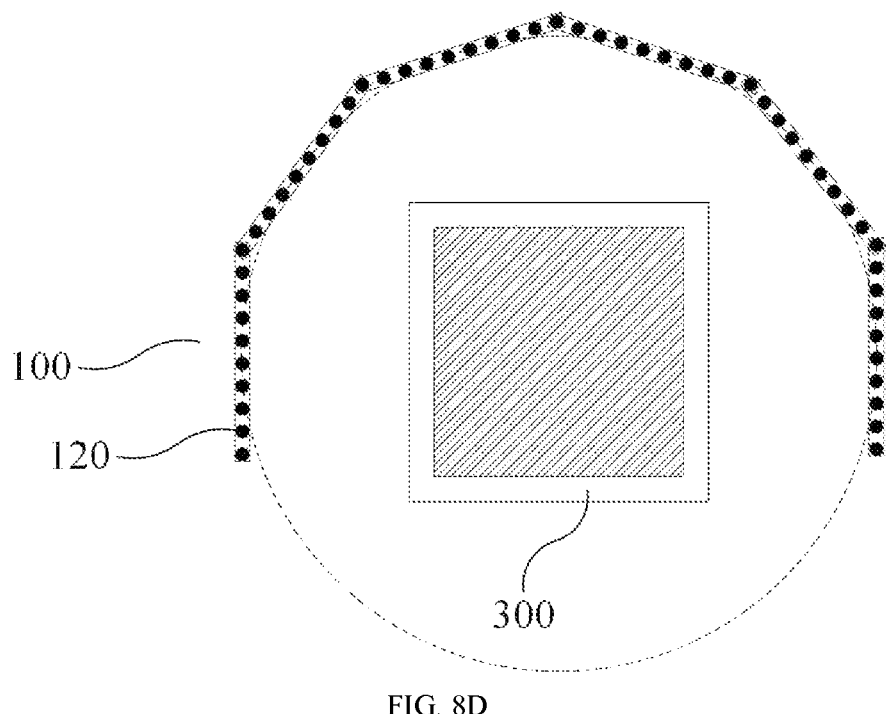
FIG. 8D shows a schematic diagram of an arrangement of a plurality of ray sources according to some embodiments of the present disclosure, in which a superposition state of two ray sources at first to third scanning positions relative to a carrying device is shown.

FIG. 8A shows a schematic diagram of an arrangement of a plurality of ray sources according to some embodiments of the present disclosure, in which two ray sources are located at a first scanning position relative to the carrying device. FIG. 8B shows a schematic diagram of an arrangement of a plurality of ray sources according to some embodiments of the present disclosure, in which two ray sources are located at a second scanning position relative to the carrying device. FIG. 8C shows a schematic diagram of an arrangement of a plurality of ray sources according to some embodiments of the present disclosure, in which two ray sources are located at a third scanning position relative to the carrying device. FIG. 8D shows a schematic diagram of an arrangement of a plurality of ray sources according to some embodiments of the present disclosure, in which a superposition state of two ray sources at first to third scanning positions relative to the carrying device 300 is shown.

As shown in FIG. 8A, two ray sources 100 at the first scanning position relative to the carrying device 300 may cover a first scanning angle. When the two ray sources 100 are located at the first scanning position relative to the carrying device 300, target spots 120 of the two ray sources 100 may sequentially emit X-rays in a predetermined order, while the two ray sources 100 may be lifted or lowered along the rotation axis relative to the carrying device 300, and may emit X-rays to pass through the object to be inspected (shown as a shaded portion). Therefore, the inspection system may complete a scanning process at the first scanning position.

After the scanning process at the first scanning position is completed, the two ray sources 100 may rotate around the rotation axis relative to the carrying device 300 (for example, in a clockwise direction) to the second scanning position. As shown in FIG. 8B, the two ray sources 100 located at the second scanning position relative to the carrying device 300 may cover a second scanning angle. When the two ray sources 100 are located at the second scanning position relative to the carrying device 300, the target spots 120 of the two ray sources 100 may sequentially emit X-rays in a predetermined order, while the two ray sources 100 may be lifted or lowered along the rotation axis relative to the carrying device 300, and may emit X-rays to pass through the object to be inspected (shown as a shaded portion). Therefore, the inspection system may complete a scanning process at the second scanning position.

After the scanning process at the second scanning position is completed, the two ray sources 100 may rotate around the rotation axis relative to the carrying device 300 (for example, in a clockwise direction) to the third scanning position. As shown in FIG. 8C, the two ray sources 100 at the third scanning position relative to the carrying device 300 may cover a third scanning angle. When the two ray sources 100 are located at the third scanning position relative to the carrying device 300, target spots 120 of the two ray sources 100 may sequentially emit X-rays in a predetermined order, while the two ray sources 100 may be lifted or lowered along the rotation axis relative to the carrying device 300, and may emit X-rays to pass through the object to be inspected (shown as a shaded portion). Therefore, the inspection system may complete a scanning process at the third scanning position.

Through three scanning processes of the two ray sources 100 at the first to third scanning positions relative to the carrying device 300, as shown in FIG. 8D, the inspection system may combine the scanning angle at the first scanning position, the scanning angle at the second scanning position and the scanning angle at the third scanning position to generate a combined scanning angle. Therefore, the combined scanning angle generated by the inspection system through the rotation of the two ray sources 100 between the three scanning positions relative to the carrying device 300 is equivalent to a scanning angle generated simultaneously by six ray sources 100.

Figure 9:
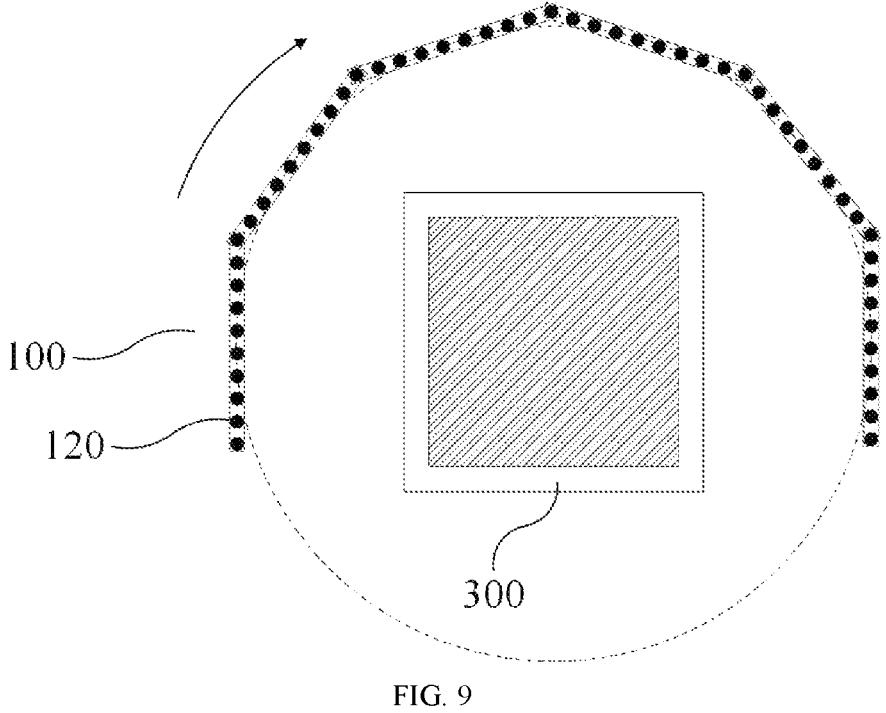
FIG. 9 shows a schematic diagram of a ray source according to some embodiments of the present disclosure, in which a superposition state of the ray source at first to sixth scanning positions relative to a carrying device is shown.

As described above, the inspection system includes a plurality of ray sources 100. However, embodiments of the present disclosure are not limited thereto. In some embodiments, the inspection system may include one ray source 100. In some embodiments, the ray source 100 may have six scanning positions relative to the carrying device 300. FIG. 9 shows a schematic diagram of a ray source according to some embodiments of the present disclosure, in which a superposition state of the ray source at first to sixth scanning positions relative to the carrying device is shown. For the rotation of the ray source 100 between different scanning positions relative to the carrying device 300 and a plurality of scanning processes, reference may be made to each ray source 100 described above, which will not be repeated here. Through six scanning processes of the ray source 100 at the first to sixth scanning positions relative to the carrying device 300, as shown in FIG. 9, the inspection system may combine a scanning angle at the first scanning position, a scanning angle at the second scanning position, . . . and a scanning angle at the sixth scanning position to generate a combined scanning angle. Therefore, the combined scanning angle generated by the inspection system through the rotation of the ray source 100 among the six scanning positions relative to the carrying device 300 is equivalent to a scanning angle generated simultaneously by six ray sources 100.

According to some embodiments of the present disclosure, the inspection system may splice out a virtual ray source having a combined scanning angle through the rotation of the one or more ray sources 100 between different scanning positions relative to the carrying device 300. In an exemplary embodiment, the rotation of the one or more ray sources 100 of the inspection system between different scanning positions relative to the carrying device 300 may achieve a combined scanning angle which is target spot-continuous, that is, the virtual ray source is target spot-continuous. This is equivalent to a scanning angle generated simultaneously by a plurality of independent ray sources 100 arranged continuously (which together form a multi-segment broken line), or equivalent to a scanning angle generated by a multi-segment broken line type ray source (the number of segments of the broken line here depends on the number of ray sources 100 and the number of scanning positions) which is target spot-continuous. Herein, the "target spot-continuous" represents that a spacing between the target spots of the spliced virtual ray source is less than or equal to a minimum target spot spacing that meets a requirement of an image spatial resolution of the inspection system.

According to some embodiments of the present disclosure, no target spot is provided at one or two ends of the ray source 100 in a circumferential direction. For example, as the ray source 100 may include components such as a frame structure at one or two ends in the circumferential direction, target spots may not be provided at the end(s) of the ray source 100 in the circumferential direction. In this case, if the plurality of ray sources 100 are connected end to end, there may be missing target spots in end regions of two adjacent ray sources 100. Similarly, if the virtual ray source spliced by the rotation of the one or more ray sources 100 between different scanning positions relative to the carrying device 300 has a contour of a plurality of ray sources connected end to end, there may also be missing target spots in the virtual ray source.

In an exemplary embodiment, the rotation angle of the one or more ray sources 100 between different scanning positions relative to the carrying device 300 may be selected so that the spliced virtual ray source has no missing target spots. According to some embodiments of the present disclosure, as shown in FIG. 7C, the rotation angle θ of each ray source 100 between two adjacent scanning positions relative to the carrying device 300 is less than a scanning angle α of the ray source 100 relative to the rotation axis. In some embodiments, a rotation distance of each ray source 100 between two adjacent scanning positions relative to the carrying device 300 is less than a length of the ray source 100 in a rotation direction. Thus, in the contour of the virtual ray source spliced by rotating the one or more ray sources 100 relative to the carrying device 300 during multiple scanning processes, the contour of the ray source before relative rotation and the contour of the ray source after relative rotation may partially overlap, so that missing target spots of the virtual ray source may be avoided.

According to some embodiments of the present disclosure, as shown in FIG. 13, the inspection system is configured such that the X-rays emitted by the one or more ray sources 100 are at least a predetermined height higher than a carrying surface CS of the carrying device 300 during a process of lifting or lowering the one or more ray sources 100 relative to the carrying device 300. In some embodiments, the predetermined height is determined by a pallet thickness d of the aviation pallet cargo to be inspected. In some embodiments, the predetermined height is equal to the pallet thickness d of the aviation pallet cargo. For example, the aviation pallet cargo is placed on the carrying surface of the carrying device 300. By controlling a lifting and lowering height of the ray source 100 in combination with the pallet thickness, the X-rays emitted by the ray source 100 may not pass through or less pass through the pallet of the aviation pallet cargo, thereby reducing or eliminating an impact of the pallet on the scanning imaging. For example, the pallet may contain high-density metal or plastic, etc., which is not conducive to X-ray fluoroscopy.

It should be understood that the rotation direction (clockwise or counterclockwise), the number of scanning positions, the order of passing the scanning positions, etc. described above are just illustrative, and should not be considered as limiting embodiments of the present disclosure.

As described above, a target spot-continuous virtual ray source may be spliced out through the rotation of the one or more ray sources 100 relative to the carrying device 300. However, embodiments of the present disclosure are not limited thereto. In some embodiments, in the virtual ray source spliced by the rotation of the one or more ray sources 100 relative to the carrying device 300, there may be a region where target spots are missing, that is, the target spots of the spliced virtual ray source may be discontinuous. In a case of missing target spots, according to some embodiments of the present disclosure, the inspection system may perform data compensation, such as a data compensation algorithm, etc.

Three ray sources 100 with two scanning positions, two ray sources 100 with three scanning positions and one ray source 100 with six scanning positions are illustrated above by way of example in describing the virtual ray source spliced by the rotation of the one or more ray sources 100 relative to the carrying device 300. However, embodiments of the present disclosure are not limited thereto. According to embodiments of the present disclosure, the inspection system may include more or fewer ray sources 100 and/or include more or fewer scanning positions.

According to some embodiments of the present disclosure, when viewed along the central axis of the carrying device 300, the one or more ray sources 100 of the inspection system may be translatable between at least two scanning positions relative to the carrying device 300.

According to some embodiments of the present disclosure, each ray source 100 has a scanning angle. Here, the "scanning angle" of each ray source 100 refers to an angle range of all the target spots of the ray source 100 relative to the central axis of the carrying device 300. When viewed along the central axis of the carrying device 300, if a ray source 100 translates from a scanning position to another scanning position relative to the carrying device 300 the scanning angle of the ray source 100 relative to the central axis of the carrying device 300 may rotate accordingly. According to some embodiments of the present disclosure, a translation of each ray source 100 between different scanning positions relative to the carrying device 300 may provide a combined scanning angle relative to the central axis. In some embodiments, when the inspection system includes a plurality of ray sources 100, the translation of the plurality of ray sources 100 between different scanning positions relative to the carrying device 300 may also provide a combined scanning angle relative to the central axis of the carrying device 300. In some embodiments, the combined scanning angle generated by the translation of the one or more ray sources 100 between different scanning positions relative to the carrying device 300 may be continuous or discontinuous.

According to some embodiments of the present disclosure, through the translation of the one or more ray sources 100 between different scanning positions relative to the carrying device 300, the inspection system may splice a larger combined scanning angle and ray emission range. Therefore, the translation of the ray source 100 relative to the carrying device 300 may generate a larger scanning angle than a fixed ray source.

According to some embodiments of the present disclosure, the inspection system may also reconstruct a three-dimensional scanning image of the object to be inspected based on the detection data of the detector assembly 200. In an exemplary embodiment, the translation of the one or more ray sources 100 of the inspection system between different scanning positions relative to the carrying device 300 may generate a combined scanning angle greater than 180 degrees relative to the central axis. When the inspection system has a combined scanning angle greater than 180 degrees, the inspection system may generate more complete scanning data, and produce a better CT scanning effect and a better three-dimensional scanning image.

According to some embodiments of the present disclosure, a translation distance of each ray source 100 between two adjacent scanning positions relative to the carrying device 300 is greater than a spacing between adjacent target spots of the ray source 100. Therefore, the translation of the ray source 100 between different scanning positions relative to the carrying device 300 may generate a combined scanning angle so as to achieve a wider range of scanning.

A structure of the one or more translatable ray sources according to some embodiments of the present disclosure will be described in detail below with reference to the accompanying drawings.

Figure 10A:
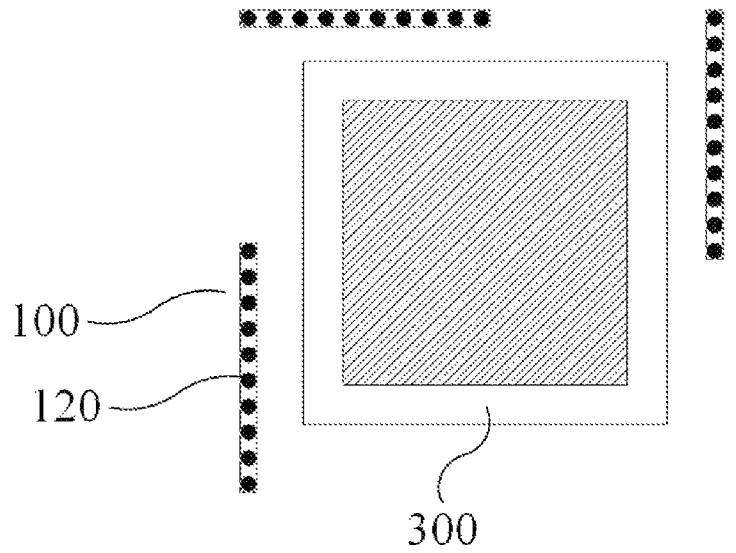
FIG. 10A shows a schematic diagram of an arrangement of a plurality of ray sources according to some embodiments of the present disclosure, in which three ray sources are located at a first scanning position relative to a carrying device.
Figure 10B:
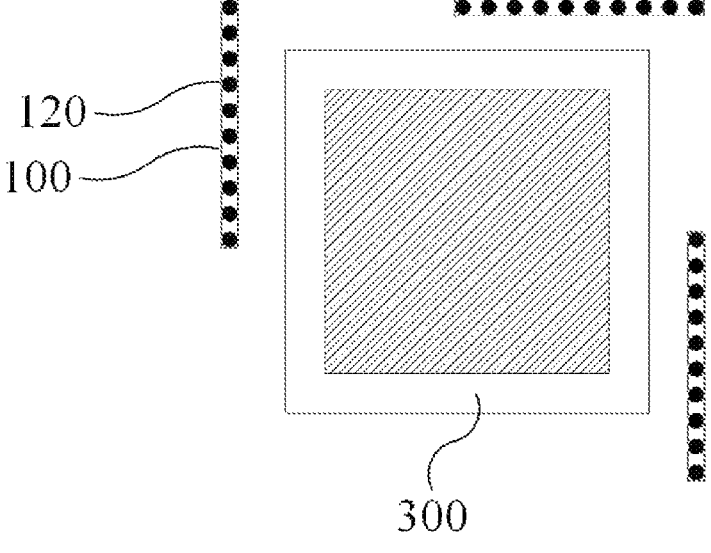
FIG. 10B shows a schematic diagram of an arrangement of a plurality of ray sources according to some embodiments of the present disclosure, in which three ray sources are located at a second scanning position relative to a carrying device.
Figure 10C:
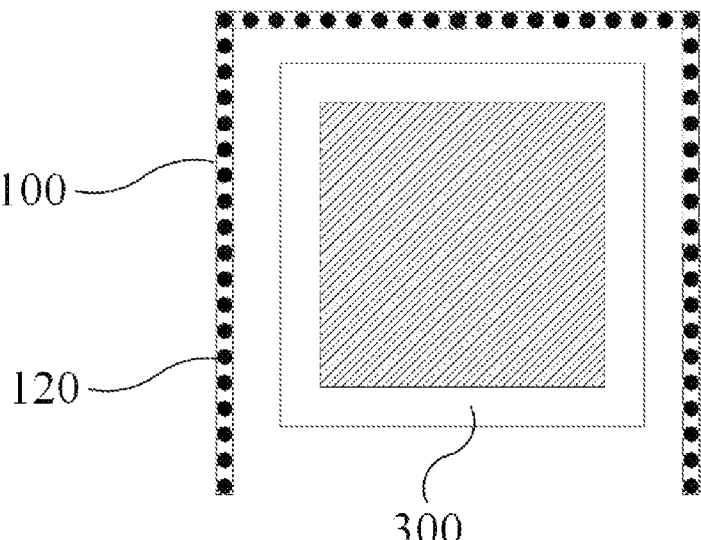
FIG. 10C shows a schematic diagram of an arrangement of a plurality of ray sources according to some embodiments of the present disclosure, in which a superposition state of three ray sources at first and second scanning positions relative to a carrying device is shown.

According to some embodiments of the present disclosure, as shown in FIG. 10A to FIG. 10C, each ray source 100 includes a plurality of target spots 120 spaced apart. It should be noted that other structures of the ray source 100 are not shown in FIG. 10A to FIG. 10C. In an exemplary embodiment, the plurality of target spots 120 of each ray source 100 have a uniform spacing between target spots. In some embodiments, the plurality of target spots 120 of each ray source 100 are distributed along a straight line.

An inspection system including three ray sources 100 will be illustrated by way of example in describing the following exemplary embodiment. In an exemplary embodiment, the three ray sources 100 are spaced apart from each other. The three ray sources 100 may be spaced around the carrying device 300. In some embodiments, each ray source 100 may have two scanning positions, and the ray source 100 is translatable between the two scanning positions relative to the carrying device 300. According to some embodiments of the present disclosure, when the inspection system includes a plurality of ray sources 100, the plurality of ray sources 100 may translate between different scanning positions relative to the carrying device 300 synchronously. According to some embodiments of the present disclosure, when viewed along the central axis of the carrying device 300, the translation of the ray source 100 relative to the carrying device 300 may be achieved by translating the ray source 100 while the carrying device 300 remains stationary, or may be achieved by translating the carrying device 300 while the ray source 100 remains stationary, or may be achieved by translating the ray source 100 and the carrying device 300 respectively.

FIG. 10A shows a schematic diagram of an arrangement of a plurality of ray sources according to some embodiments of the present disclosure, in which three ray sources are located at a first scanning position relative to the carrying device. FIG. 10B shows a schematic diagram of an arrangement of a plurality of ray sources according to some embodiments of the present disclosure, in which three ray sources are located at a second scanning position relative to the carrying device. FIG. 10C shows a schematic diagram of an arrangement of a plurality of ray sources according to some embodiments of the present disclosure, in which a superposition state of three ray sources at first and second scanning positions relative to the carrying device is shown.

In some embodiments, when viewed along the central axis of the carrying device 300, the three ray sources 100 are respectively arranged on left, front and right sides of the inspection region, as shown in FIG. 10A and FIG. 10B. However, embodiments of the present disclosure are not limited thereto. It should be understood that the number and arrangement positions of the relatively translatable ray sources, the number of scanning positions and the movement order of scanning positions described herein are merely illustrative, and should not be considered as limiting the present disclosure.

As shown in FIG. 10A, the three ray sources 100 located at the first scanning position relative to the carrying device 300 may cover a scanning angle. When the three ray sources 100 are located at the first scanning position relative to the carrying device 300, target spots 120 of the three ray sources 100 may sequentially emit X-rays in a predetermined order, while the three ray sources 100 may be lifted or lowered (for example, from the upper end to the lower end of the inspection region) along the rotation axis relative to the carrying device 300, so that the emitted X-rays pass through the object to be inspected (shown as a shaded portion) and are received by the detector assembly (not shown in FIG. 10A). Therefore, the inspection system may complete a scanning process at the first scanning position.

After the scanning process at the first scanning position is completed, the three ray sources 100 may translate to the second scanning position relative to the carrying device 300. As shown in FIG. 10B, the three ray sources 100 located at the second scanning position relative to the carrying device 300 may cover another scanning angle. When the three ray sources 100 are located at the second scanning position relative to the carrying device 300, the target spots 120 of the three ray sources 100 may sequentially emit X-rays in a predetermined order, while the three ray sources 100 may be lifted or lowered along the rotation axis relative to the carrying device 300, and may emit X-rays to pass through the object to be inspected (shown as a shaded portion). Therefore, the inspection system may complete a scanning process at the second scanning position.

Through two scanning processes of the three ray sources 100 at the first scanning position and the second scanning position relative to the carrying device 300, as shown in FIG. 10C, the inspection system may combine the scanning angle at the first scanning position and the scanning angle at the second scanning position to generate a combined scanning angle. Therefore, the combined scanning angle generated by the inspection system through the translation of the three ray sources 100 between the two scanning positions relative to the carrying device 300 is equivalent to a scanning angle generated simultaneously by six ray sources 100.

According to some embodiments of the present disclosure, the inspection system may splice a virtual ray source having a combined scanning angle through the translation of the one or more ray sources 100 between different scanning positions relative to the carrying device 300. In an exemplary embodiment, the translation of the one or more ray sources 100 of the inspection system between different scanning positions relative to the carrying device 300 may achieve a scanning angle which is target spot-continuous, that is, the virtual ray source is target spot-continuous. This is equivalent to a scanning angle generated simultaneously by a plurality of independent ray sources arranged continuously (which together form a multi-segment broken line), or equivalent to a scanning angle generated by a multi-segment broken line type ray source (the number of segments of the broken line here depends on the number of ray sources 100 and the number of scanning positions) which is target spot-continuous.

According to some embodiments of the present disclosure, no target spot is provided at one or two ends of the ray source 100 in a circumferential direction. For example, since the ray source 100 may include components such as a frame structure at one or two ends in the circumferential direction, target spots may not be provided at the end(s) of the ray source 100 in the circumferential direction. In this case, if the plurality of ray sources 100 are connected end to end, there may be missing target spots in end regions of two adjacent ray sources 100. Similarly, if the virtual ray source spliced by the translation of the one or more ray sources 100 between different scanning positions relative to the carrying device 300 has a contour of a plurality of ray sources connected end to end, there may also be missing target spots in the virtual ray source.

In an exemplary embodiment, in order to achieve the "target spot-continuous", a translation distance of the one or more ray sources 100 between different scanning positions relative to the carrying device 300 may be selected, so that the spliced virtual ray source has no missing target spots. According to some embodiments of the present disclosure, the translation distance of each ray source 100 between two adjacent scanning positions relative to the carrying device 300 is less than a length of the ray source in the translation direction. Thereby, in the contour of the virtual ray source spliced by translating the one or more ray sources 100 relative to the carrying device 300 during multiple scanning processes, the contour of the ray source before relative translation and the contour of the ray source after relative translation may partially overlap, so that missing target spots of the virtual ray source may be avoided.

As described above, the ray source 100 translates one time relative to the carrying device 300, that is, the ray source 100 has two scanning positions. However, embodiments of the present disclosure are not limited thereto. In some embodiments, the one or more ray sources 100 of the inspection system may translate relative to the carrying device 300 multiple times, that is, translate among at least three scanning positions relative to the carrying device 300.

As described above, the one or more ray sources may rotate or translate between different scanning positions relative to the carrying device 300. However, embodiments of the present disclosure are not limited thereto. In some embodiments, when viewed along the rotation axis or the central axis of the carrying device, the ray source(s) of the inspection system may neither rotate nor translate. For example, the inspection system may include a plurality of ray sources 100 arranged continuously, and the plurality of ray sources 100 have a scanning angle greater than 180 degrees around the inspection region. In this case, when the inspection system performs an inspection on an object to be inspected, the plurality of ray sources 100 do not need to rotate or translate relative to the carrying device 300, but only need to be lifted or lowered along the rotation axis or the central axis relative to the carrying device 300 one time, without the need of reciprocally relatively lifting and lowering.

As described above, the plurality of ray sources 100 rotate or translate between different scanning positions relative to the carrying device 300 synchronously. However, embodiments of the present disclosure are not limited thereto. In some embodiments, when the inspection system includes a plurality of ray sources 100, the plurality of ray sources 100 may rotate or translate between different scanning positions relative to the carrying device 300 asynchronously.

As described above, the plurality of target spots in each ray source 100 are arranged along a straight line. However, embodiments of the present disclosure are not limited thereto. In some embodiments, the plurality of target spots in the ray source 100 may also be arranged along an arc line, a broken line, etc.

As described above, the plurality of target spots in the ray source 100 have a uniform target spot spacing. However, embodiments of the present disclosure are not limited thereto. In some embodiments, the plurality of target spots in the ray source 100 may also be arranged non-uniformly, that is, the target spot spacing may be non-uniform.

As described above, the ray sources 100 are spaced apart. However, embodiments of the present disclosure are not limited thereto. In some embodiments, different ray sources 100 may also be arranged continuously. For example, in a case that the inspection system includes three ray sources 100, the three ray sources 100 may be arranged continuously and sequentially; or two of the three ray sources 100 may be arranged continuously, and the remaining ray source 100 may be spaced apart from the two ray sources 100.

In a large object such as an aviation pallet cargo, the items inside often pile up and overlap with each other. In order to obtain more internal details in the perspective scanning, it is often needed to increase the number of target spots so that the target spot spacing is less than a predetermined value, thereby improving a spatial resolution of the image through a scanning method with densified sampling. The principle of a target spot densification according to some embodiments of the present disclosure will be described below with reference to the accompanying drawings.

According to some embodiments of the present disclosure, the one or more ray sources 100 may move locally relative to the carrying device 300 to achieve the densified sampling. In some embodiments, when viewed along the rotation axis or the central axis of the carrying device 300, each ray source 100 is locally movable between a plurality of target spot positions relative to the carrying device 300. Herein, a "target spot position" refers to a position used to increase a density of target spots and capable of completing the scanning process. In an exemplary embodiment, after the inspection system completes the scanning process at one scanning position, the ray source 100 may move from a current scanning position (as a target spot position) to a next target spot position relative to the carrying device 300. In this case, the plurality of target spot positions include the current scanning position.

According to some embodiments of the present disclosure, the one or more ray sources 100 of the inspection system may move locally relative to the carrying device 300 one or more times to increase the density of target spots, with two or more target spot positions. The inspection system performs a scanning process at each target spot position. According to some embodiments of the present disclosure, a local movement of the ray source 100 relative to the carrying device 300 may include a rotation or a translation.

A structure of the one or more ray sources that are locally movable relative to the carrying device 300 according to some embodiments of the present disclosure will be described in detail below with reference to the accompanying drawings. An inspection system including three ray sources 100 that translate at different target spot positions relative to the carrying device 300 will be illustrated by way of example in describing the following exemplary embodiment.

Figure 11A:
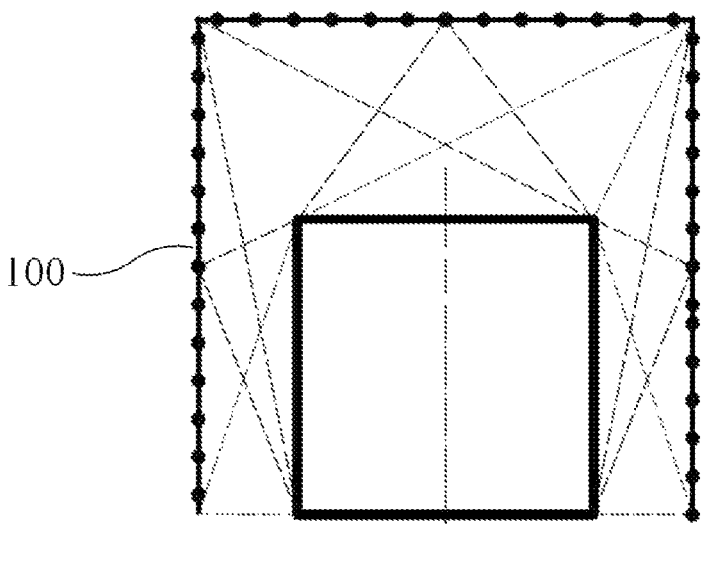
FIG. 11A shows a schematic diagram of an arrangement of a plurality of ray sources according to some embodiments of the present disclosure, in which three ray sources are located at a first target spot position relative to a carrying device.

FIG. 11A shows a schematic diagram of an arrangement of a plurality of ray sources according to some embodiments of the present disclosure, in which three ray sources are located at a first target spot position relative to the carrying device. When the three ray sources 100 are located at the first target spot position relative to the carrying device 300, the three ray sources 100 may complete a scanning process at the first target spot position.

Figure 11B:
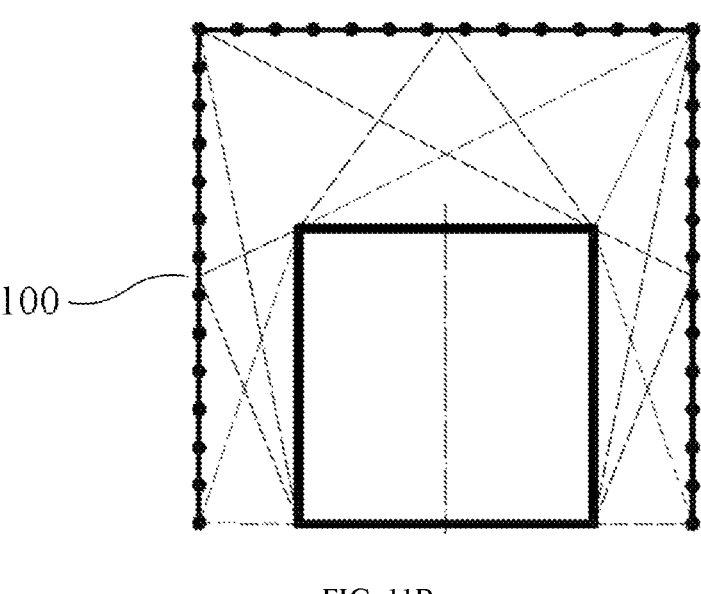
FIG. 11B shows a schematic diagram of an arrangement of a plurality of ray sources according to some embodiments of the present disclosure, in which three ray sources are located at a second target spot position relative to a carrying device.

FIG. 11B shows a schematic diagram of an arrangement of a plurality of ray sources according to some embodiments of the present disclosure, in which three ray sources are located at a second target spot position relative to the carrying device. After completing the scanning process at the first target spot position, the three ray sources 100 may move to the second target spot position relative to the carrying device 300. When the three ray sources 100 are located at the second target spot position relative to the carrying device 300, the three ray sources 100 may complete another scanning process at the second target spot position.

Figure 11C:
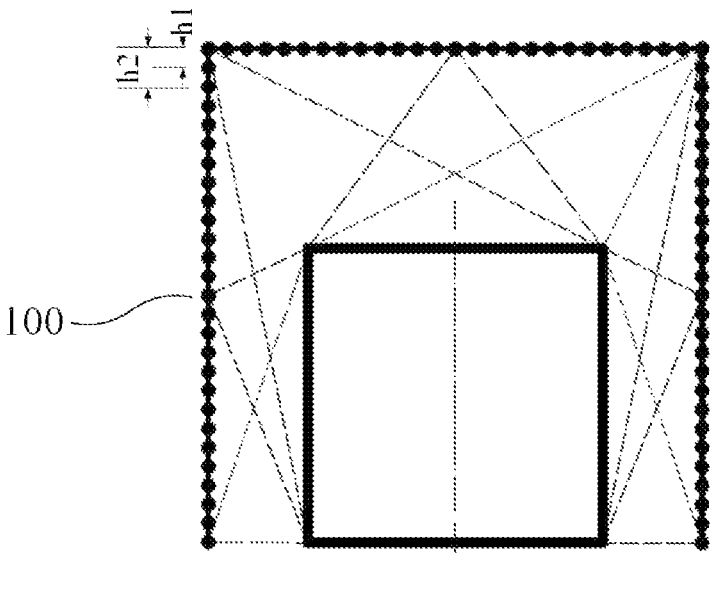
FIG. 11C shows a schematic diagram of an arrangement of a plurality of ray sources according to some embodiments of the present disclosure, in which a superposition state of three ray sources at first and second target spot positions is shown.

FIG. 11C shows a schematic diagram of an arrangement of a plurality of ray sources according to some embodiments of the present disclosure, in which a superposition state of three ray sources at first and second target spot positions is shown. Through two scanning processes of the three ray sources 100 at the first target spot position and the second target spot position, as shown in FIG. 11C, the inspection system may combine a target spot distribution at the first target spot position and a target spot distribution at the second target spot position to generate a combined target spot distribution. Therefore, the inspection system may increase the density of target spots through the combined target spot distribution generated by the translation of the three ray sources 100 between the two target spot positions relative to the carrying device 300, so that the spatial resolution of the perspective image may be improved through the scanning method with densified sampling.

According to some embodiments of the present disclosure, a movement distance of each ray source 100 between two adjacent target spot positions relative to the carrying device 300 is less than a movement distance of the ray source 100 between two adjacent scanning positions relative to the carrying device 300. In some embodiments, a rotation angle of each ray source 100 between two adjacent target spot positions relative to the carrying device 300 is less than a rotation angle of the ray source 100 between two adjacent scanning positions relative to the carrying device 300. Therefore, the local movement of the ray source between different target spot positions relative to the carrying device is different from a larger-scale movement of the ray source between different scanning positions relative to the carrying device. The local movement of the ray source between different target spot positions relative to the carrying device is used to generate a combined target spot distribution so as to achieve a local target spot densification, while the movement of the ray source between different scanning positions relative to the carrying device is used to generate a combined scanning angle so as to achieve a wider range of scanning.

In some embodiments, the rotation angle of each ray source 100 between two adjacent target spot positions relative to the carrying device 300 is less than an angle β (as shown in FIG. 7C) of two adjacent target spots of the ray source 100 relative to the rotation axis or the central axis of the carrying device 300. In some embodiments, the movement distance h1 of each ray source 100 between two adjacent target spot positions relative to the carrying device 300 is less than a target spot spacing h2 between two adjacent target spots of the ray source 100, as shown in FIG. 11C. In some embodiments, the movement distance of each ray source 100 between two adjacent target spot positions relative to the carrying device 300 may be half or one-third, etc. of the target spot spacing. For example, when the movement distance of each ray source 100 between two adjacent target spot positions relative to the carrying device 300 is half of the target spot spacing, the ray source 100 may have double the target spot density; and when the movement distance of each ray source 100 between two adjacent target spot positions relative to the carrying device 300 is one-third of the target spot spacing, the ray source 100 may have three times the target spot density.

According to some embodiments of the present disclosure, a movement distance of each ray source 100 between two farthest target spot positions relative to the carrying device 300 is less than the target spot spacing between two adjacent target spots of the ray source 100. In some embodiments, a rotation angle of each ray source 100 between two farthest target spot positions relative to the carrying device 300 is less than an angle of two adjacent target spots of the ray source 100 relative to the rotation axis or the central axis of the carrying device 300. Thus, the movement of the ray source 100 between different target spot positions relative to the carrying device 300 is a local movement within the target spot spacing. Therefore, such local movement of the ray source 100 relative to the carrying device 300 may increase the target spot density more effectively.

According to some embodiments of the present disclosure, the inspection system may be configured such that: the one or more ray sources 100 do not emit X-rays when the one or more ray sources 100 move between different target spot positions relative to the carrying device 300. Therefore, when the target spot densification is required, the one or more ray sources 100 stop emitting X-rays and then move from the current target spot position to another target spot position relative to the carrying device 300.

As described above, the ray source 100 translates between different target spot positions relative to the carrying device 300 to achieve the target densification. However, embodiments of the present disclosure are not limited thereto. In some embodiments, the ray source 100 may also achieve the target spot densification by rotating between different target spot positions relative to the carrying device 300. For the rotation of the ray source 100 between different target spot positions relative to the carrying device 300, reference may be made to the rotation of the ray source 100 between different scanning positions relative to the carrying device 300 described above, which will not be repeated here.

An inspection method according to some embodiments of the present disclosure will be described in detail below. According to some embodiments of the present disclosure, the inspection method may be implemented using any of the inspection systems described above.

In step S10, an object to be inspected is carried on the carrying device 300 of the inspection system and located in an inspection region.

In step S20, the one or more ray sources 100 of the inspection system are located at one of a plurality of scanning positions around the carrying device 300.

In step S30, the one or more ray sources 100 and the detector assembly 200 are lifted or lowered along a rotation axis (relatively lifted or relatively lowered) relative to the carrying device 300, while the one or more ray sources 100 emit X-rays so that the X-rays pass through the object to be inspected located in the inspection region and are received by the detector assembly 200. When the one or more ray sources 100 and the detector assembly 200 are lifted or lowered a predetermined distance relative to the carrying device 300, a scanning process is completed.

According to some embodiments of the present disclosure, the predetermined distance corresponds to a height of a region of interest of the object to be inspected. In an exemplary embodiment, the predetermined distance is equal to a height of the object to be inspected. In some embodiments, when the object to be inspected is the aviation pallet cargo, the predetermined distance may be equal to a height of the aviation pallet cargo excluding the pallet thickness. In some embodiments, the predetermined distance is adaptively determined based on the detection data of the detector assembly.

In an exemplary embodiment, the object to be inspected is the aviation pallet cargo, or known as an air container. However, embodiments of the present disclosure are not limited thereto. According to some embodiments of the present disclosure, the inspection method may also be used to inspect other types of objects, especially an object with a large size.

In step S40, the one or more ray sources 100 rotate to another one of the plurality of scanning positions around the rotation axis relative to the carrying device 300, and step S30 is repeated to complete the scanning process at each of the plurality of scanning positions.

The use of three ray sources 100 each having two scanning positions will be illustrated by way of example with reference to the accompanying drawings in describing the following exemplary embodiment. FIG. 12A to FIG. 12D respectively show schematic diagrams of implementing an inspection method by using an inspection system according to some embodiments of the present disclosure.

Figure 12A:
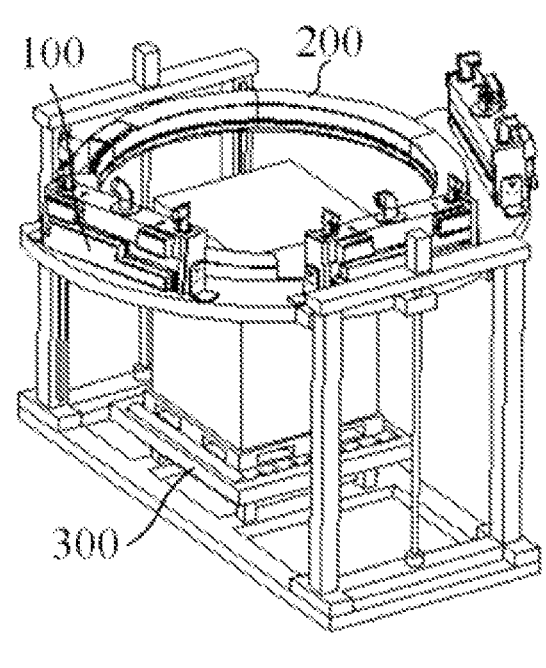
FIG. 12A to FIG. 12D respectively show schematic diagrams of implementing an inspection method by using an inspection system according to some embodiments of the present disclosure.

As shown in FIG. 12A, three ray sources 100 of the inspection system are located at a first scanning position in the two scanning positions around the carrying device 300. The three ray sources 100 and the detector assembly 200 are located at the upper end of the inspection region.

Figure 12B:
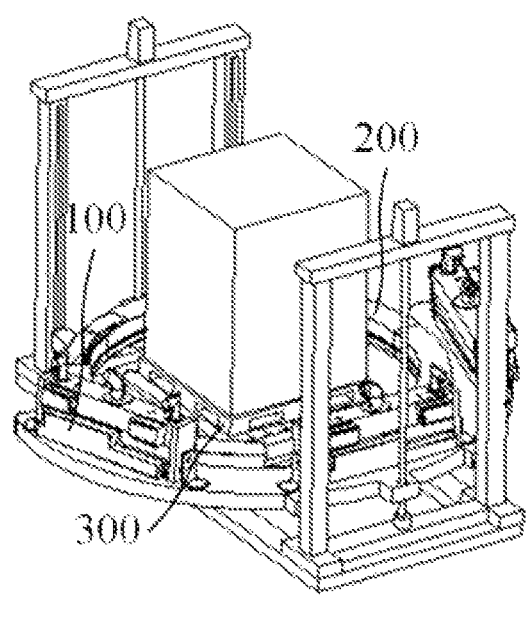

Then, the three ray sources 100 and the detector assembly 200 are lowered along the rotation axis, while the three ray sources 100 emit X-rays in a predetermined order. The emitted X-rays pass through the object to be inspected located in the inspection region and are received by the detector assembly 200. As shown in FIG. 12B, when the three ray sources 100 and the detector assembly 200 are lowered to the lower end of the inspection region, the three ray sources 100 stop emitting X-rays, and a lowering of the three ray sources 100 and the detector assembly 200 is stopped. Therefore, a scanning process at the first scanning position is completed.

Figure 12C:
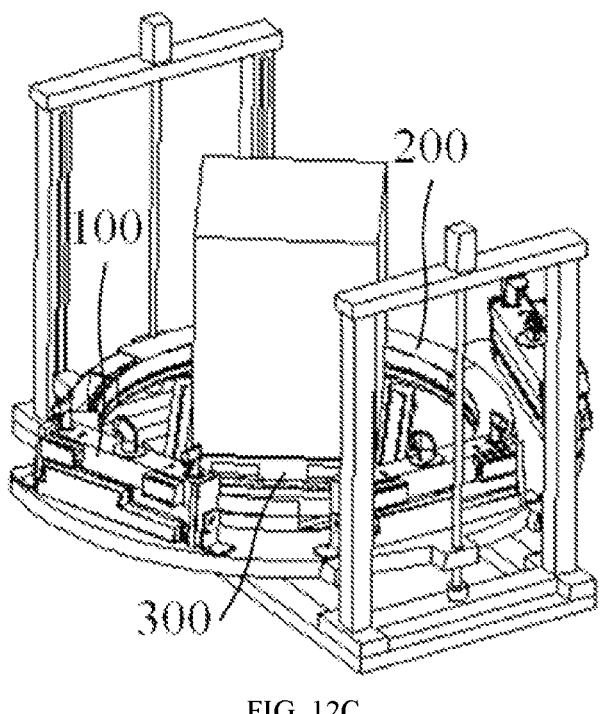

After the scanning process at the first scanning position is completed, as shown in FIG. 12C, the carrying device 300 drives the object to be inspected to rotate around the rotation axis, and the two ray sources 100 and the detector assembly 200 remain stationary. Therefore, the two ray sources 100 may rotate to a second scanning position relative to the carrying device 300. Then, the three ray sources 100 and the detector assembly 200 are lifted along the rotation axis, while the three ray sources 100 emit X-rays in a predetermined order. The emitted X-rays pass through the object to be inspected located in the inspection region and are received by the detector assembly 200.

Figure 12D:
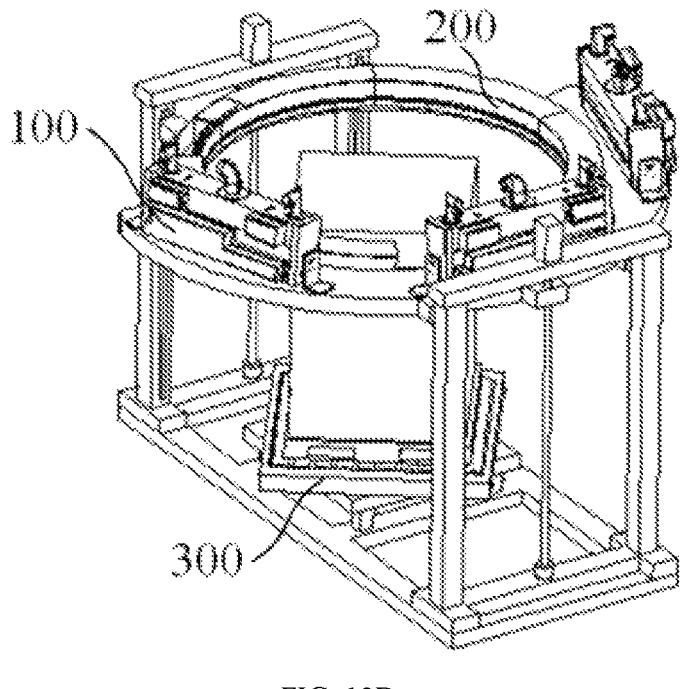

As shown in FIG. 12D, when the three ray sources 100 and the detector assembly 200 are lifted to the upper end of the inspection region, the three ray sources 100 stop emitting X-rays, and a lifting of the three ray sources 100 and the detector assembly 200 is stopped. Therefore, a scanning process at the second scanning position is completed.

An implementation process of the inspection method has been described above by taking the example of using three ray sources 100 each having two scanning positions. When more or fewer ray sources 100 are used and/or each ray source 100 has more or fewer scanning positions, the inspection method may be performed similarly, as long as the scanning process at each of the plurality of scanning positions may be completed, and the specific steps will not be repeated here.

In some embodiments, the rotation angle of each ray source 100 between two adjacent scanning positions relative to the carrying device 300 is greater than the angle of adjacent target spots of the ray source 100 relative to the rotation axis.

In an exemplary embodiment, the inspection method may also include, after step S40, reconstructing a three-dimensional scanning image (CT image) of the object to be inspected based on the detection data of the detector assembly 200.

One or more ray sources 100 are used in the inspection method described above. In a case of a plurality of ray sources 100, vacuum spaces of different ray sources 100 are not communicated.

In some embodiments, such as the embodiments shown in FIG. 12A to FIG. 12D, a lifting or lowering of the one or more ray sources 100 and the detector assembly 200 relative to the carrying device 300 is stopped after each time the one or more ray sources 100 and the detector assembly 200 are lifted or lowered a predetermined distance relative to the carrying device 300. In two adjacent repetitions of step S30, that is, in two adjacent processes of relatively lifting and lowering, the one or more ray sources 100 and the detector assembly 200 are lifted or lowered relative to the carrying device 300 in opposite directions. Therefore, a scanning process may be performed each time the one or more ray sources 100 and the detector assembly 200 are lifted or lowered relative to the carrying device 300, so that the inspection efficiency and the object passing rate may be improved. However, embodiments of the present disclosure are not limited thereto. In some embodiments, the inspection method may also be implemented to lift or lower the one or more ray sources 100 and the detector assembly 200 in the same direction relative to the carrying device 300 in each scanning process.

According to some embodiments of the present disclosure, the rotation angle of each ray source 100 between two adjacent scanning positions relative to the carrying device 300 is less than the scanning angle of the ray source 100 relative to the rotation axis. With reference to the above description, a plurality of scanning processes of the inspection method may achieve a combined scanning angle which is target spot-continous.

In some embodiments, the one or more ray sources 100 and the detector assembly 200 may be lifted or lowered relative to the carrying device 300 in a uniform linear motion. In some embodiments, the ray sources 100 stop emitting X-rays after each time the one or more ray sources 100 and the detector assembly 200 are lifted or lowered a predetermined distance relative to the carrying device 300.

In some embodiments, step S30 and step S40 of the inspection method are repeated so that the one or more ray sources 100 have a combined scanning angle greater than 180 degrees relative to the carrying device 300. When the inspection method provides a combined scanning angle greater than 180 degrees, it is possible to produce more complete scanning data and a better CT scanning effect.

In some embodiments, the X-rays emitted by the one or more ray sources 100 are at least a predetermined height higher than the carrying surface of the carrying device 300 during the process of lifting or lowering the one or more ray sources 100 relative to the carrying device 300. In some embodiments, the predetermined height is determined by the pallet thickness of the aviation pallet cargo to be inspected. In some embodiments, the predetermined height is equal to the pallet height of the aviation pallet cargo. For example, the aviation pallet cargo is placed on the carrying surface of the carrying device 300. By controlling a relative lifting or lowering height of the ray source 100 in combination with the pallet thickness, the X-rays emitted by the ray source 100 may not pass through or less pass through the pallet of the aviation pallet cargo, thereby reducing or eliminating the impact of the pallet on the scanning imaging. For example, the pallet may contain high-density metal or plastic, etc., which is not conducive to X-ray fluoroscopy.

In some embodiments, the inspection method may also include, after completing a scanning process at a scanning position in step S30, moving the one or more ray sources 100 to one of the plurality of target spot positions relative to the carrying device 300 and repeating step S30. The plurality of target spot positions include the current scanning position. In this case, the inspection method may achieve densified sampling through the local movement of the ray source 100 relative to the carrying device 300. For other implementations of densified sampling or target spot densification, reference may be made to the above description, which will not be repeated here.

Other implementations of the inspection system used in the inspection method according to some embodiments of the present disclosure may refer to the above description and may be accordingly incorporated into embodiments of the inspection method, and details will not be described here.

Figure 14:
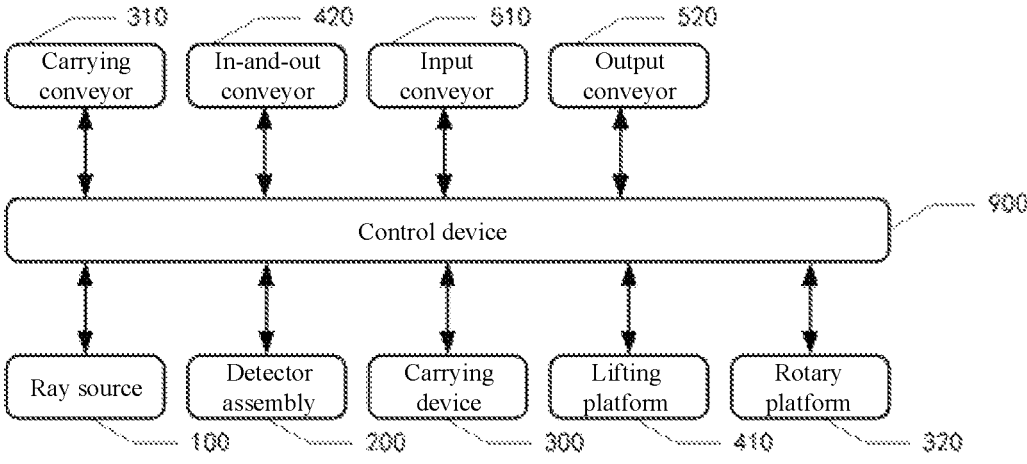
FIG. 14 schematically shows a block diagram of an inspection system according to some embodiments of the present disclosure.
Figure 15:
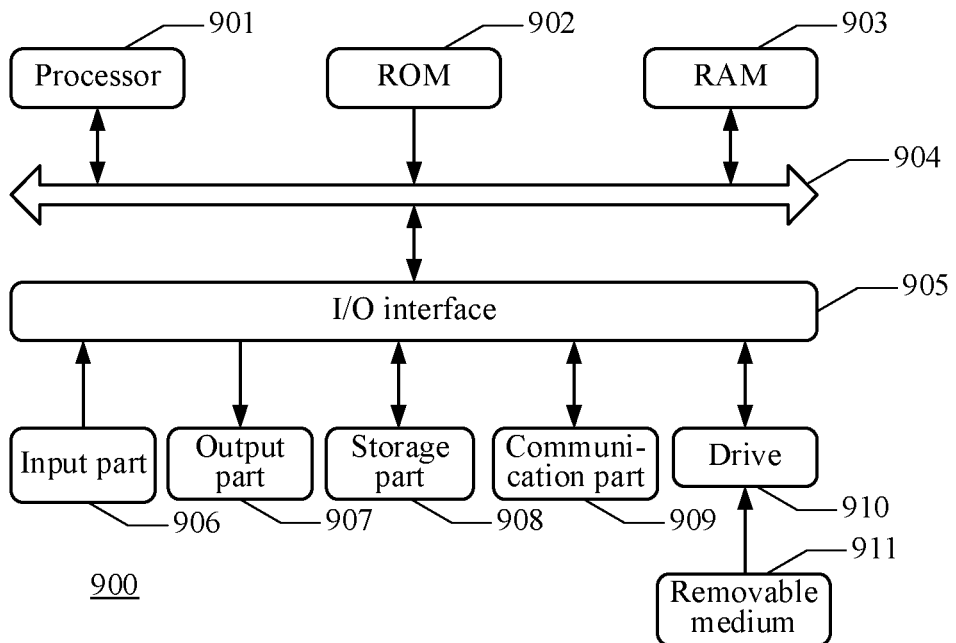
FIG. 15 schematically shows a block diagram of a control device according to some embodiments of the present disclosure.

It should be understood that the inspection system according to some embodiments of the present disclosure may include a control device 900. FIG. 14 schematically shows a block diagram of an inspection system according to some embodiments of the present disclosure. FIG. 15 schematically shows a block diagram of a control device according to some embodiments of the present disclosure. With reference to FIG. 14 and FIG. 15, the control device 900 may be communicatively connected to the ray source 100, the detector assembly 200, the carrying device 300, the lifting platform 410, the rotary platform 320 and various conveyors including the carrying conveyor 310. The control device 900 may output various control signals, so that the ray source 100, the detector assembly 200, the carrying device 300, the lifting platform 410 and the rotary platform 320 and various conveyors including the carrying conveyor 310 in the inspection system perform various steps or operations in the inspection method described above.

As shown in FIG. 15, an electronic device 900 according to embodiments of the present disclosure includes a processor 901, which may execute various appropriate actions and processing according to a program stored in a read only memory (ROM) 902 or a program loaded into a random access memory (RAM) 903 from a storage part 908. The processor 901 may include, for example, a general-purpose microprocessor (for example, CPU), an instruction set processor and/or a related chipset and/or a special-purpose microprocessor (for example, an application specific integrated circuit (ASIC)), and the like. The processor 901 may further include an on-board memory for caching purposes.

The processor 901 may include a single processing unit or a plurality of processing units for executing different actions of the inspection method according to embodiments of the present disclosure.

Various programs and data required for operations of the electronic device 900 are stored in the RAM 903. The processor 901, the ROM 902 and the RAM 903 are connected to each other through a bus 904. The processor 901 executes various operations or actions of the inspection method according to embodiments of the present disclosure by executing the programs in the ROM 902 and/or the RAM 903. It should be noted that the program may also be stored in one or more memories other than the ROM 902 and the RAM 903. The processor 901 may also execute various operations of the inspection method according to embodiments of the present disclosure by executing the programs stored in the one or more memories.

According to embodiments of the present disclosure, the electronic device 900 may further include an input/output (I/O) interface 905 which is also connected to the bus 904. The electronic device 900 may further include one or more of the following components connected to the I/O interface 905: an input part 906 including a keyboard, a mouse, etc.; an output part 907 including a cathode ray tube (CRT), a liquid crystal display (LCD), etc. and a speaker, etc.; a storage part 908 including a hard disk, etc.; and a communication part 909 including a network interface card such as a LAN card, a modem, and the like. The communication part 909 performs communication processing via a network such as the Internet. A drive 910 is also connected to the I/O interface 905 as required. A removable medium 911, such as a magnetic disk, an optical disk, a magneto-optical disk, a semiconductor memory, and the like, is installed on the drive 910 as required, so that the computer program read therefrom is installed into the storage part 908 as needed.

Embodiments of the present disclosure further provide a computer-readable storage medium, which may be included in the apparatus/device/system described in the aforementioned embodiments; or exist alone without being assembled into the apparatus/device/system. The computer-readable storage medium carries one or more programs that when executed, perform the inspection method according to embodiments of the present disclosure.

According to embodiments of the present disclosure, the computer-readable storage medium may be a non-transitory computer-readable storage medium, for example, which may include but not be limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In embodiments of the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 902 and/or RAM 903 and/or one or more memories other than the ROM 902 and RAM 903.

Embodiments of the present disclosure further include a computer program product, which contains a computer program. The computer program contains program codes for performing the methods shown in flowcharts. When the computer program product runs on a computer system (such as the above-mentioned inspection system), the program codes are used to cause the electronic device to implement the inspection method provided in embodiments of the present disclosure.

When the computer program is executed by the processor 901, the functions defined in the system/apparatus of embodiments of the present disclosure are performed. According to embodiments of the present disclosure, the above-mentioned systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 909, and/or installed from the removable medium 911. The program codes contained in the computer program may be transmitted by any suitable network medium, including but not limited to a wireless one, a wired one, or any suitable combination of the above.

In such embodiments, the computer program may be downloaded and installed from the network via the communication part 909 and/or installed from the removable medium 911. When the computer program is executed by the processor 901, the above-mentioned functions defined in the systems of embodiments of the present disclosure are performed. According to embodiments of the present disclosure, the systems, apparatuses, devices, modules, units, etc. described above may be implemented by computer program modules.

According to embodiments of the present disclosure, the program codes for executing the computer programs provided by embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program codes may be completely executed on a user computing device, partially executed on a user device, partially executed on a remote computing device, or completely executed on a remote computing device or a server. In a case of involving a remote computing device, the remote computing device may be connected to the user computing device through any kind of network, including local area network (LAN) or wide area network (WAN), or may be connected to an external computing device (e.g., through the Internet using an Internet service provider).

It should be noted that herein, unless otherwise stated, the expression "the inspection system is configured such that . . . " means that the processor 901 may generate a control signal according to a program stored in the read only memory (ROM) 902 or a program loaded from the storage part 908 into the random access memory (RAM) 903, so as to control the ray source 100, the detector assembly 200, the carrying device 300, the lifting platform 410, the rotary platform 320 and the various conveyors including the carrying conveyor 310 in the inspection system to perform various steps or operations in the inspection method described above.

Embodiments of the present disclosure provide an inspection system and an inspection method in which a dynamic-static combined scanning method is used, especially an inspection system and an inspection method for an aviation pallet cargo. An inspection system and an inspection method that meet the needs of CT reconstruction are also provided, especially an inspection system and an inspection method for an aviation pallet cargo. An inspection system and an inspection method that may improve spatial resolution and recognition accuracy are also provided, especially an inspection system and an inspection method for an aviation pallet cargo. An inspection system and an inspection method that may improve maintainability and reduce costs are also provided, especially an inspection system and an inspection method for an aviation pallet cargo. An inspection system and an inspection method that reduce the difficulty of loading and unloading objects are also provided, especially an inspection system and an inspection method for an aviation pallet cargo.

According to embodiments of the present disclosure, a dynamic-static combined scanning method is used in the inspection system and the inspection method. It is possible to splice out a larger combined scanning angle and ray emission range through the rotation or translation of the one or more ray sources relative to the carrying device, so as to produce more complete scanning data and better scanning effect. When the combined scanning angle meets CT reconstruction needs, it is possible to produce better CT scanning effect and better three-dimensional scanning image. The one or more ray sources move between different scanning positions relative to the carrying device (the number of movements is generally less than 10 times), so that the object passing rate and the imaging quality may be improved. The inspection system and the inspection method according to embodiments of the present disclosure are particularly suitable for scanning a large-sized object such as an aviation pallet cargo. Different from an existing design in which, for example, a slip ring is used, embodiments of the present disclosure may reduce the size and manufacturing cost of the inspection system and improve the stability of the inspection system. The inspection system and the inspection method according to embodiments of the present disclosure may also achieve a target spot densification through a local movement of the one or more ray sources, thereby improving the spatial resolution and recognition accuracy of a perspective image. Different from vertical CT scanning, the inspection system and the inspection method according to embodiments of the present disclosure may provide a scanning section with a small cross-sectional area, thereby improving the imaging quality. In addition, the X-rays may either not pass through or rarely pass through the pallet of the aviation pallet cargo, thereby reducing or eliminating the impact of the pallet on the scanning imaging.

The present disclosure has been described with reference to exemplary embodiments. However, it should be understood that the present disclosure is not limited to the constructions and methods of the aforementioned embodiments. On the contrary, the present disclosure is intended to cover modified examples and equivalent configurations. In addition, although various elements and method steps of the present disclosure are shown in various exemplary combinations and constructions, other combinations including more or fewer elements or methods also fall within the scope of the present disclosure.

What is claimed is:

1. An inspection system, comprising:
    a carrying device configured to carry an object to be inspected in an inspection region of the inspection system;
    at least one ray source configured to emit X-rays, wherein each ray source comprises a separate housing to define a vacuum space and comprises a plurality of target spots enclosed within the housing; and a detector assembly configured to receive X-rays emitted from the at least one ray source and passing through the inspection region, wherein the at least one ray source is rotatable between a plurality of scanning positions around a rotation axis relative to the carrying device, and the at least one ray source and the detector assembly are lifted or lowered along the rotation axis relative to the carrying device;

wherein the inspection system is configured such that: the at least one ray source and the detector assembly are lifted or lowered along the rotation axis relative to the carrying device and the at least one ray source emits X-rays, when the at least one ray source is located at one of the plurality of scanning positions relative to the carrying device; and the at least one ray source rotates around the rotation axis relative to the carrying device to another one of the plurality of scanning positions, when the at least one ray source and the detector assembly are lifted or lowered a predetermined distance relative to the carrying device, and wherein the inspection system is further configured to reconstruct a three-dimensional scanning image of the object to be inspected based on detection data of the detector assembly, wherein a rotation angle of the at least one ray source between two adjacent scanning positions relative to the carrying device is greater than an angle of adjacent target spots of each ray source relative to the rotation axis; and wherein the at least one ray source is further configured to be movable between at least two target spot positions relative to the carrying device, and a rotation angle of each ray source between two adjacent target spot positions relative to the carrying device is less than an angle of two adjacent target spots of the ray source relative to the rotation axis, or a movement distance of each ray source between two adjacent target spot positions relative to the carrying device is less than a spacing between two adjacent target spots of the ray source.

2. The inspection system of claim 1, wherein the at least one ray source is configured to rotate between different scanning positions relative to the carrying device, so that a combined scanning angle of the at least one ray source is greater than 180 degrees.

3. The inspection system of claim 1, wherein the inspection system is configured such that: the at least one ray source and the detector assembly are not lifted or lowered along the rotation axis relative to the carrying device when the at least one ray source rotates between different scanning positions relative to the carrying device.

4. The inspection system of claim 1, wherein a rotation angle of the at least one ray source between two adjacent scanning positions relative to the carrying device is less than a scanning angle of the ray source relative to the rotation axis.

5. The inspection system of claim 1, wherein a rotation angle of each ray source between two farthest target spot positions relative to the carrying device is less than the angle of two adjacent target spots of the ray source relative to the rotation axis, or a movement distance of each ray source between two farthest target spot positions relative to the carrying device is less than the spacing between two adjacent target spots of the ray source.

6. The inspection system of claim 1, wherein the rotation axis is parallel to a vertical direction;

wherein a ray emission direction of each ray source is not perpendicular to the rotation axis;

wherein the inspection system is configured such that: the at least one ray source is configured not to emit X-rays when the at least one ray source rotates between different scanning positions relative to the carrying device;

wherein the detector assembly is arranged radially closer to the rotation axis relative to the at least one ray source; and wherein the at least one ray source comprises a plurality of ray sources, and the plurality of ray sources are spaced around the carrying device.

7. The inspection system of claim 6, wherein target spots of the at least one ray source are located in a first plane;

wherein detector crystals of the detector assembly are located in a second plane; and wherein the first plane is parallel to the second plane, and a target spot of each ray source is configured to deflect a predetermined tilt angle toward the detector assembly along the rotation axis, so that the X-rays emitted by each ray source are not blocked by the detector assembly before passing through the inspection region.

8. The inspection system of claim 7, wherein the detector assembly comprises a plurality of detector arms, each detector arm is provided with a plurality of detector units, and each detector arm is configured to receive X-rays emitted by at least two ray sources;

wherein each detector unit comprises a detector crystal, and each detector crystal is arranged at an end of a corresponding detector unit close to the at least one ray source along the rotation axis; and wherein the plurality of detector arms are configured to extend completely around the rotation axis to form a detector ring.

9. The inspection system of claim 1, wherein the carrying device further comprises a carrying conveyor configured to transport the object to be inspected on the carrying device to enter and leave the inspection region; and wherein the at least one ray resource and the detector assembly are lifted or lowered along the rotation axis relative to the carrying device to not obstructing the object to be inspected from entering or leaving the inspection region, when the carrying conveyor transports the object to be inspected to enter or leave the inspection region.

10. The inspection system of claim 9, further comprising: an input conveyor configured to transport the object to be inspected to the carrying conveyor, wherein the input conveyor is movable close to and away from the carrying conveyor;

wherein the inspection system further comprises: an output conveyor configured to receive the object to be inspected from the carrying conveyor, wherein the output conveyor is movable close to and away from the carrying conveyor;

wherein the inspection system further comprises: an entrance conveyor configured to maintain a fixed position and transport the object to be inspected to the input conveyor, wherein the input conveyor is movable between the entrance conveyor and the carrying conveyor; and wherein the inspection system further comprises: an exit conveyor configured to maintain a fixed position and receive the object to be inspected from the output conveyor, wherein the output conveyor is movable between the exit conveyor and the carrying conveyor.

11. The inspection system of claim 1, wherein the at least one ray source is rotatable around the rotation axis; and/or the detector assembly is rotatable around the rotation axis.

12. The inspection system of claim 1, wherein the carrying device is rotatable around the rotation axis.

13. The inspection system of claim 1, wherein the at least one ray source and the detector assembly are lifted or lowered along the rotation axis; or the carrying device is configured such that a carrying surface of the carrying device is lifted or lowered along the rotation axis.

14. An inspection method, comprising:

(a) carrying an object to be inspected on a carrying device and in an inspection region;

(b) positioning at least one ray source at one of a plurality of scanning positions surrounding the carrying device, wherein each ray source comprises a separate housing to define a vacuum space and comprises a plurality of target spots enclosed within the housing;

(c) lifting or lowering the at least one ray source and the detector assembly along a rotation axis relative to the carrying device, while emitting X-rays from the at least one ray source, so that the X-rays pass through the object to be inspected and are received by the detector assembly, and a scanning process is completed until the at least one ray source and the detector assembly are lifted or lowered a predetermined distance relative to the conveying device; and (d) rotating the at least one ray source around the rotation axis relative to the carrying device to another one of the plurality of scanning positions, and repeating step (c) to complete a scanning process at each of the plurality of scanning positions; and (e) reconstructing a three-dimensional scanning image of the object to be inspected based on detection data of the detector assembly, wherein a rotation angle of the at least one ray source between two adjacent scanning positions relative to the carrying device is greater than an angle of adjacent target spots of each ray source relative to the rotation axis:

wherein the inspection method further comprises: after completing a scanning process at a scanning position in step (c), moving the at least one ray source to one of a plurality of target spot positions relative to the carrying device and repeating step (c), wherein the plurality of target spot positions comprise a current scanning position; and wherein a rotation angle of each ray source between two adjacent target spot positions relative to the carrying device is less than an angle of two adjacent target spots of the ray source relative to the rotation axis, or a movement distance of each ray source between two adjacent target spot positions relative to the carrying device is less than a spacing between two adjacent target spots of the ray source.

15. The inspection method of claim 14, wherein steps (c) and (d) are repeated, so that a combined scanning angle of the at least one ray source is greater than 180 degrees.

16. The inspection method of claim 14, wherein a lifting or lowering of the at least one ray source and the detector assembly relative to the carrying device is stopped after each time the at least one ray source and the detector assembly are lifted or lowered the predetermined distance relative to the carrying device, and in two adjacent repetitions of step (c), the at least one ray source and the detector assembly are lifted or lowered in opposite directions relative to the carrying device; and wherein a rotation angle of the ray source between two adjacent scanning positions relative to the carrying device is less than a scanning angle of the ray source relative to the rotation axis.

17. The inspection method of claim 14, wherein a rotation angle of each ray source between two farthest target spot positions relative to the carrying device is less than the angle of two adjacent target spots of the ray source relative to the rotation axis, or a movement distance of each ray source between two farthest target spot positions relative to the carrying device is less than the spacing between two adjacent target spots of the ray source.

18. The inspection method of claim 14, wherein the rotation axis is parallel to a vertical direction;

wherein a ray emission direction of each ray source is not perpendicular to the rotation axis;

wherein the at least one ray source is configured not to emit X-rays when the at least one ray source rotates between different scanning positions relative to the carrying device; and wherein the predetermined distance is adaptively determined based on the detection data of the detector assembly.

* * * * *